United States Patent
Wise et al.

(10) Patent No.: US 12,273,459 B2
(45) Date of Patent: Apr. 8, 2025

(54) SYSTEM AND METHOD FOR ELECTRONIC CLAIM VERIFICATION

(71) Applicant: DocuSign, Inc., San Francisco, CA (US)

(72) Inventors: Joshua D. Wise, Seattle, WA (US); Brian Wishan, Seattle, WA (US); Bei Wang, Seattle, WA (US); Darren Louie, Seattle, WA (US); Blake Thomas Walsh, Seattle, WA (US)

(73) Assignee: Docusign, Inc., San Francisco, CA (US)

( * ) Notice: Subject to any disclaimer, the term of this patent is extended or adjusted under 35 U.S.C. 154(b) by 217 days.

(21) Appl. No.: 16/580,863

(22) Filed: Sep. 24, 2019

(65) Prior Publication Data
US 2020/0389319 A1   Dec. 10, 2020

Related U.S. Application Data

(60) Provisional application No. 62/859,586, filed on Jun. 10, 2019.

(51) Int. Cl.
| | | |
|---|---|---|
| H04L 9/40 | (2022.01) | |
| G06F 21/64 | (2013.01) | |
| H04L 9/32 | (2006.01) | |

(52) U.S. Cl.
CPC ............ *H04L 9/3247* (2013.01); *G06F 21/64* (2013.01); *H04L 9/3213* (2013.01); *H04L 2209/60* (2013.01)

(58) Field of Classification Search
CPC . H04L 9/3247; H04L 9/3213; H04L 2209/60; H04L 63/0807; H04L 63/0823; H04L 63/123; G06F 21/64; G06F 21/31
See application file for complete search history.

(56) References Cited

U.S. PATENT DOCUMENTS 5,699,514 A * 12/1997 Durinovic-Johri ..... G06F 21/31
                                                                                              726/19
5,897,616 A *  4/1999 Kanevsky ............... G10L 17/22
                                                                                          704/270.1

(Continued)

FOREIGN PATENT DOCUMENTS

| AU | 2012261779 B2 * | 7/2016 | ............. G06Q 20/02 |
| CN | 101127107 A * | 2/2008 | ............. H04L 9/321 |

(Continued)

OTHER PUBLICATIONS

International Search Report and Written Opinion, Patent Cooperation Treaty Application No. PCT/US2020/034444, Jul. 28, 2020, 16 pages.

(Continued)

*Primary Examiner* — Shahriar Zarrineh
(74) *Attorney, Agent, or Firm* — Shumaker & Sieffert, P.A.

(57) ABSTRACT

Various embodiments support or provide for an extensible electronic claim verification system that offers extensible support for electronic verification by one or more external electronic claim verification services that are external to the extensible electronic claim verification system. For some embodiments, the extensible claim verification system is readily configurable (e.g., by a user) to add or remove access to one or more external claim verification services available for use through the extensible electronic claim verification system by a client device. Some embodiments implement the extensible support by using a unified protocol for interfacing with different external claim verification services. By use of the unified protocol, various embodiments enable an external claim verification service to plug into an extensible claim verification system, thereby permitting a user to (Continued)

extend support of the extensible claim verification system to different types of external claim verification services.

14 Claims, 9 Drawing Sheets

(56) References Cited

U.S. PATENT DOCUMENTS

| | | | | |
|---|---|---|---|---|
| 6,167,518 A * | 12/2000 | Padgett | ................. | H04L 9/3263 |
| | | | | 713/176 |
| 6,959,861 B1 * | 11/2005 | Walters | ................. | G06Q 10/10 |
| | | | | 235/382 |
| 7,047,204 B1 * | 5/2006 | Wood | ................... | G06Q 20/342 |
| | | | | 705/4 |
| 7,509,499 B2 * | 3/2009 | von Mueller | ....... | H04L 63/0876 |
| | | | | 726/20 |
| 8,095,972 B1 | 1/2012 | Floyd et al. | | |
| 8,185,743 B1 * | 5/2012 | Goott | ................... | G06Q 20/401 |
| | | | | 713/156 |
| 9,043,602 B1 * | 5/2015 | Krieger | ................. | H04W 12/06 |
| | | | | 713/181 |
| 9,419,968 B1 * | 8/2016 | Pei | ...................... | H04W 12/068 |
| 9,503,452 B1 * | 11/2016 | Kumar | .................. | H04L 67/306 |
| 9,699,173 B1 * | 7/2017 | Roth | ...................... | G06F 21/31 |
| 9,734,351 B2 * | 8/2017 | Hermann | .............. | G06Q 10/10 |
| 10,277,402 B2 * | 4/2019 | VanBlon | .............. | H04L 9/3247 |
| 10,387,695 B2 * | 8/2019 | Engels | .............. | G06K 7/10366 |
| 10,872,152 B1 * | 12/2020 | Martel | ................. | G06F 21/31 |
| 10,943,003 B2 * | 3/2021 | Bingham | ............ | G06F 21/32 |
| 2001/0051996 A1 * | 12/2001 | Cooper | .............. | H04L 63/0823 |
| | | | | 705/26.1 |
| 2002/0038290 A1 * | 3/2002 | Cochran | ............... | G06Q 10/10 |
| | | | | 705/50 |
| 2002/0042879 A1 * | 4/2002 | Gould | ................ | G06Q 20/3825 |
| | | | | 713/176 |
| 2002/0083008 A1 * | 6/2002 | Smith | ................... | G06Q 20/00 |
| | | | | 705/64 |
| 2002/0087858 A1 | 7/2002 | Oliver et al. | | |
| 2003/0070072 A1 * | 4/2003 | Nassiri | ................. | H04L 9/3247 |
| | | | | 713/168 |
| 2003/0070101 A1 * | 4/2003 | Buscemi | ............... | H04L 63/08 |
| | | | | 726/8 |
| 2003/0131102 A1 * | 7/2003 | Umbreit | ................ | G06F 21/31 |
| | | | | 709/224 |
| 2003/0233557 A1 * | 12/2003 | Zimmerman | ........ | G06V 40/30 |
| | | | | 713/170 |
| 2004/0139327 A1 * | 7/2004 | Brown | .................. | G06F 21/34 |
| | | | | 713/176 |
| 2004/0189441 A1 * | 9/2004 | Stergiou | ............... | H04M 3/382 |
| | | | | 726/5 |
| 2004/0243518 A1 * | 12/2004 | Clifton | ................. | G06Q 30/06 |
| | | | | 705/72 |
| 2006/0259440 A1 * | 11/2006 | Leake | ................ | G06Q 20/3821 |
| | | | | 705/76 |
| 2007/0043949 A1 * | 2/2007 | Bugbee | ................ | H04L 9/3247 |
| | | | | 713/176 |
| 2007/0110282 A1 * | 5/2007 | Millsapp | ............... | G06V 40/10 |
| | | | | 705/72 |
| 2007/0208944 A1 * | 9/2007 | Pavlicic | ................ | G06F 21/645 |
| | | | | 713/176 |
| 2007/0220259 A1 * | 9/2007 | Pavlicic | ................ | H04L 9/3297 |
| | | | | 713/176 |
| 2007/0261114 A1 * | 11/2007 | Pomerantsev | ....... | G06F 16/9535 |
| | | | | 726/12 |
| 2007/0277040 A1 * | 11/2007 | Scheidt | ................ | H04L 9/3033 |
| | | | | 713/176 |
| 2008/0015883 A1 * | 1/2008 | Hermann | ............. | G06Q 10/105 |
| | | | | 705/317 |
| 2008/0086759 A1 * | 4/2008 | Colson | ................... | G06F 21/40 |
| | | | | 713/182 |
| 2008/0175360 A1 | 7/2008 | Schwarz et al. | | |
| 2009/0049298 A1 * | 2/2009 | Hatter | .................. | H04L 9/3231 |
| | | | | 713/176 |
| 2009/0063320 A1 * | 3/2009 | Powell | ................... | G06Q 40/02 |
| | | | | 705/35 |
| 2009/0096579 A1 * | 4/2009 | Arcas | ..................... | G06Q 10/10 |
| | | | | 340/5.86 |
| 2010/0106578 A1 * | 4/2010 | Allio | ...................... | G06Q 30/02 |
| | | | | 705/14.15 |
| 2010/0153707 A1 * | 6/2010 | Lentz, II | ............... | H04L 63/102 |
| | | | | 726/5 |
| 2010/0313273 A1 * | 12/2010 | Freas | ..................... | G06F 21/40 |
| | | | | 707/769 |
| 2011/0078072 A1 * | 3/2011 | Ganjigunta | ............ | G06Q 40/02 |
| | | | | 705/38 |
| 2011/0289318 A1 * | 11/2011 | Zhang | .................. | H04L 9/3247 |
| | | | | 713/176 |
| 2012/0278240 A1 * | 11/2012 | Schwarz | ............. | G06Q 20/4014 |
| | | | | 705/44 |
| 2013/0019289 A1 | 1/2013 | Gonser et al. | | |
| 2013/0030989 A1 | 1/2013 | Geller et al. | | |
| 2013/0275590 A1 * | 10/2013 | Wong | ...................... | H04L 67/01 |
| | | | | 709/225 |
| 2013/0318354 A1 * | 11/2013 | Entschew | ............. | H04L 9/3247 |
| | | | | 713/175 |
| 2014/0379585 A1 * | 12/2014 | Buelloni | ................ | G06F 21/42 |
| | | | | 705/76 |
| 2015/0074776 A1 * | 3/2015 | Gonser | ................... | G06F 21/64 |
| | | | | 726/6 |
| 2015/0096004 A1 * | 4/2015 | Zhou | ..................... | H04L 9/3247 |
| | | | | 726/7 |
| 2015/0120334 A1 * | 4/2015 | Jones | ..................... | G06Q 40/08 |
| | | | | 705/4 |
| 2015/0150090 A1 * | 5/2015 | Carroll | ............... | H04L 63/1425 |
| | | | | 726/3 |
| 2016/0371694 A1 * | 12/2016 | Zito | ...................... | G06Q 20/204 |
| 2017/0206607 A1 * | 7/2017 | Slater, Sr. | ............... | G06Q 40/08 |
| 2017/0324750 A1 | 11/2017 | Khan | | |
| 2017/0344245 A1 * | 11/2017 | Kumar | .................. | G06F 21/645 |
| 2018/0157821 A1 * | 6/2018 | Fan | ......................... | G06F 21/44 |
| 2018/0204280 A1 * | 7/2018 | Painter | ................. | G06F 16/252 |
| 2018/0234433 A1 * | 8/2018 | Oberhauser | ............ | G06Q 20/02 |
| 2018/0337914 A1 * | 11/2018 | Mohamad Abdul | ...... | H04L 9/12 |
| 2019/0036864 A1 * | 1/2019 | Reuss | .................. | G06Q 20/102 |
| 2019/0044723 A1 * | 2/2019 | Prakash | .............. | G06F 21/32 |
| 2019/0089710 A1 | 3/2019 | Weinert et al. | | |
| 2019/0190723 A1 * | 6/2019 | Lee | ........................ | H04L 9/3271 |
| 2019/0306189 A1 * | 10/2019 | Torgerson | ............ | H04L 9/3213 |
| 2020/0019720 A1 * | 1/2020 | Chasman | ............ | G06F 21/6227 |
| 2020/0058086 A1 | 2/2020 | Carmichael et al. | | |
| 2020/0110870 A1 * | 4/2020 | Girdhar | ................ | H04L 63/108 |
| 2020/0134165 A1 * | 4/2020 | Boodaei | ................. | H04L 63/20 |
| 2020/0167861 A1 * | 5/2020 | Ramaswamy | ........ | H04W 12/06 |
| 2020/0250664 A1 * | 8/2020 | Kumar | ................ | H04L 63/083 |
| 2020/0364354 A1 * | 11/2020 | Schwartz | ............. | G06F 21/604 |

FOREIGN PATENT DOCUMENTS

| | | | | |
|---|---|---|---|---|
| CN | 101796526 A * | 8/2010 | ............ | G06F 21/64 |
| CN | 103501297 A * | 1/2014 | | |
| CN | 106022035 A * | 10/2016 | ............ | G06F 21/32 |
| CN | 107948177 A * | 4/2018 | ............ | G06F 21/31 |
| CN | 109257334 A * | 1/2019 | ......... | H04L 63/0823 |
| CN | 107077546 B * | 3/2020 | ............ | G06F 21/31 |
| CN | 111949952 A * | 11/2020 | ............ | G06F 21/31 |
| DE | 60221113 T2 * | 3/2008 | ......... | H04L 12/4633 |
| DE | 102010030590 A1 * | 12/2011 | ............ | G06F 21/645 |
| EP | 1093069 A2 * | 4/2001 | ............ | G06Q 10/10 |
| EP | 3356981 B1 * | 7/2021 | ............ | G06F 21/335 |
| FR | 2785119 A1 * | 4/2000 | ............ | H04W 12/06 |
| JP | 2009049554 A * | 3/2009 | | |
| JP | 2016004492 A * | 1/2016 | | |
| KR | 20080000382 A * | 1/2008 | | |
| KR | 20080011988 A * | 2/2008 | | |
| KR | 20110061078 A * | 6/2011 | | |
| KR | 20120096158 A * | 8/2012 | | |
| KR | 20140128729 A * | 11/2014 | | |
| KR | 101954268 B1 * | 5/2019 | | |

(56) References Cited

FOREIGN PATENT DOCUMENTS

| TW | 201710945 A | * | 3/2017 | ............. G06F 17/24 |
| WO | WO-9520286 A1 | * | 7/1995 | ............. G06F 21/32 |
| WO | WO-2004092965 A1 | * | 10/2004 | ............. G06Q 30/02 |
| WO | WO-2011039743 A1 | * | 4/2011 | ........... H04L 63/126 |
| WO | WO-2015010193 A1 | * | 1/2015 | ....... G06F 17/30867 |
| WO | WO2016076904 | * | 5/2016 | |
| WO | WO-2017197130 A1 | * | 11/2017 | ........... G06F 16/252 |

OTHER PUBLICATIONS

Silverman, "Identity, Claims, & Tokens—An OpenID Connect Primer, Part 1 of 3," Okta Developer, Jul. 25, 2017, Retrieved on Jul. 18, 2020 from <https://developer.okta.com/blog/2017/07/25/oidc-primer-part-1 >, 15 pages.

Extended Search Report from counterpart European Application No. 20821686.1 dated May 31, 2023, 7 pp.

International Preliminary Report on Patentability from International Application No. PCT/US2020/034444, Dec. 14, 2021, 9 Pages.

Response to Extended Search Report dated May 31, 2023, from counterpart European Application No. 20821686.1 filed Dec. 22, 2023, 23 pp.

\* cited by examiner

SYSTEM AND METHOD FOR ELECTRONIC CLAIM VERIFICATION

CROSS REFERENCE TO RELATED APPLICATION

This application claims the benefit of Provisional Patent Application No. 62/859,586, filed on Jun. 10, 2019, entitled "SYSTEM AND METHOD FOR ELECTRONIC CLAIM VERIFICATION", which is hereby incorporated by reference in its entirety into this application.

TECHNICAL FIELD

The present disclosure relates generally to electronic verification, and, more particularly, various embodiments described herein provide for systems, methods, techniques, instruction sequences, and devices that support electronic verification of claimed information, such as electronic verification of information claimed about a user.

BACKGROUND

Today, execution of a data workflow by one entity (e.g., business organization) can often involve or necessitate verification of certain information by another entity, such as via an electronic service (e.g., online service) provided by the other entity (e.g., third-party organization). Examples of such information include information claimed by an entity or user, also referred herein as claimed information or a claim. For data workflows involving user input, the ability to verify certain information (e.g., user claimed information) based on the user input can be crucial for successful workflow completion. For instance, verifying information regarding the identity of a user, such as verifying information claiming to be alternative or additional forms of identification for the user social security number, passport number, driver license number, etc.), can facilitate additional identity assurances of the user during various data workflows. This type of verification can be important (or even required in certain legal jurisdictions) where a data workflow involves, for example: a user electronically signing a legal document (e.g., via a website); or a user electronically completing a form and some portion of the user-provided information needs to be verified before the form is considered complete or accurate. Verifying user-provided information can also be important (or required) in a data workflow where the age or location of a user needs to be verified before the user can consent to an activity or transaction. Sometimes, such information verification is not possible by one entity (e.g., relying party) without the assistance or involvement of another entity (e.g., third-party or non-third-party verification provider).

BRIEF DESCRIPTION OF THE DRAWINGS

In the drawings, which are not necessarily drawn to scale, like numerals may describe similar components in different views. To easily identify the discussion of any particular element or act, the most significant digit or digits in a reference number refer to the figure number in which that element is first introduced. Some embodiments are illustrated by way of example, and not limitation, in the figures of the accompanying drawings.

DETAILED DESCRIPTION

Figure 1:
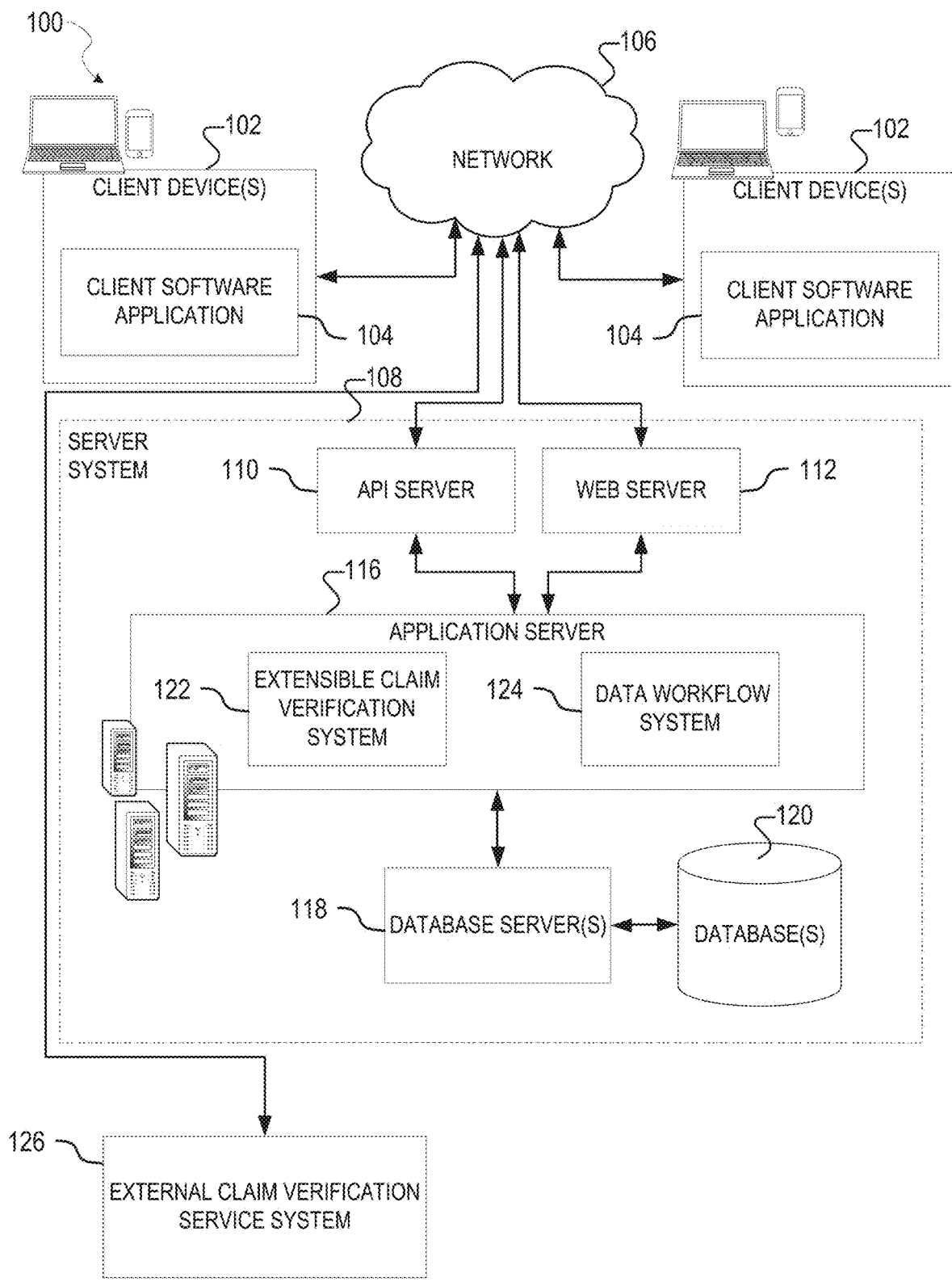
FIG. 1 is a block diagram showing an example data system that includes an extensible claim verification system that can provide access to an external claim verification service, according to some embodiments.

Various embodiments relate to electronic verification of a claim by an external claim verification service, which may be a service operated by a third-party entity (e.g., external claim verification service provider). In particular, various embodiments described herein support or provide for an extensible electronic claim verification system (also referred to herein as an extensible claim verification system) that offers extensible support for electronic verification by one or more external electronic claim verification services (also referred to herein as external claim verification services) that are external to the extensible electronic claim verification system. For some embodiments, the extensible claim verification system is readily configurable (e.g., by an individual user or an admin user through a graphical user interface (GUI)) to add or remove access to one or more external claim verification service available for use through the extensible claim verification system by a client device. Some embodiments implement the extensible support by using a unified protocol for interfacing with different external claim verification services. By use of the unified protocol, various embodiments enable a user of an external claim verification service to plug into an extensible claim verification system, thereby permitting a user to extend support of the extensible claim verification system to different types of external claim verification services. With respect to a given entity, the unified protocol can enable the extensible claim verification system to interface with (e.g., interact with) an external claim verification service that is implemented or operated by a third-party entity, or an external claim verification service that is proprietary to (e.g., custom-built for) the given entity. To enable interfacing with extensible claim verification system, a given external claim verification service can be designed or implemented to support the unified protocol.

According to some embodiments, an extensible claim verification system described herein can provide a data workflow that relies on verification of one or more external claim verification services. An example of such a data workflow can include, without limitation, one that involves the electronic signing of a document by a user whose identity is to be verified by way of an external identification verification service (as used herein, a type of external claim verification service). In particular, the extensible claim verification system can enable a client of an electronic signature service (or digital certificate service) to implement their own custom claim verification service for use in an electronic signature workflow (or a digital certificate workflow), such as a custom claim verification service that implements an authentication mechanism to challenge a user when the user accesses a document to electronically sign the document. The client in this case represent an entity that is relying on verification of one or more claims (e.g., user identity claims) prior to permitting the user to electronically sign the document.

After an extensible claim verification system described herein is configured to access a particular extensible claim verification service, the extensible claim verification system can receive from a client device (e.g., one operating a data workflow) a request to verify by the particular extensible claim verification service one or more claims for a particular user. As noted herein, an example of a claim submitted for verification can include one relating to verifying an identity of the particular user. Additionally, the received request may be one generated by the client device to authenticate access of a particular data workflow (e.g., electronic signature or digital certificate workflow) by the particular user. Eventually, a response to the received request (response provided by the extensible claim verification system to the client device) can determine whether the access is authenticated at the client device.

Based on the request, some embodiments direct (e.g., redirect via a web browser redirect) the particular user to an external claim verification service that is to verify at least one claim (of the one or more claims specified by the request). Once directed to the external claim verification service, the external claim verification service can cause the user to perform one or more actions (e.g., complete one or more steps) to verify the at least one claim. One of those actions can include, without limitation, the user authenticating their self with the external claim verification service based on credentials (e.g., username and password) provided by the user. For some embodiments, after the one or more actions are completed by the user, the external claim verification service directs (e.g., redirects) the user back to the extensible claim verification system described herein. Additionally, the external claim verification service can provide (e.g., with the redirection) a response to the extensible claim verification system, where the response can comprise data that includes a value for the at least one claim, that evidences whether the at least one claim was verified (e.g., "True" or "False" value to indicate validation), or that evidences whether the user successfully completed the one or more actions. The evidence data can be signed by the external claim verification service (e.g., using a private key) to ensure integrity of the evidence data.

After the external claim verification service directs the user back to the extensible claim verification system, the extensible claim verification system can generate a response to the request from the client device based on the response the extensible claim verification system received from the external claim verification service. The particular data workflow operating on the client device can rely on the data (e.g., evidence data) included within the response received from the extensible claim verification system. Where the particular data workflow involves electronic signing of a document, the data workflow may or may not allow the user to proceed with electronically signing the document based on the data from the response. For instance, the particular data workflow can permit the user to electronically sign if the data indicates that identity claims for the user submitted to the external claim verification service are verified (which, for example, can be used in the issuance of a digital certificate for purposes of digital signing a document). Further, the particular data workflow can record an event (e.g., successful or unsuccessful verification of claims) a transaction history based on the data included within the response.

As used herein, a claim can comprise a request for data provided by a claim verification service or an assertion of information that can be verified (e.g., as accurate or inaccurate, correct or wrong, etc.) by a claim verification service. For instance, a claim for a user can comprise an assertion of information regarding the user (e.g., information claiming to identify the user, such as different forms of identification) that can be verified by a claim verification service. Examples of a claim for identifying a user can include, without limitation, a social security number associated with a user, an e-mail address associated with a user, a driver license number of a user, a passport number of a user, a legal name associated with a user, a username, and the like. Other examples of a claim regarding a user can include, without limitation, a residential address of the user, a billing address of the user, a country of citizenship of the user, one or more privileges/permissions associated with the user, account information for the user, and the like As used herein, an external identification verification service can comprise an external claim verification service that verifies a claim relating to the identity of a user (e.g., based on user-provided information). For an external identification verification service, the verification of an identity of a user based on a claim can simply comprise the user authenticating with the external identification verification service.

As used herein, verifying a particular claim can comprise submitting asserted information of the particular claim to an external electronic verification service and receiving a verification result from the external electronic verification service indicating whether the asserted information was successfully verified (e.g., as accurate). Additionally, or alternatively, verifying a particular claim can comprise submitting the identifier of the particular claim (e.g., label associated with particular claim, such as "e-mail address") to an external electronic verification service and receiving a value for the particular claim (e.g., john_smith@domain.com) from the external electronic verification service, thereby obtaining a value for the particular claim.

The description that follows includes systems, methods, techniques, instruction sequences, and devices that embody illustrative embodiments of the disclosure. In the following description, for the purposes of explanation, numerous specific details are set forth in order to provide an understanding of various embodiments of the inventive subject matter. It will be evident, however, to those skilled in the art, that embodiments of the inventive subject matter may be practiced without these specific details. In general, well-known instruction instances, protocols, structures, and techniques are not necessarily shown in detail.

Reference will now be made in detail to embodiments of the present disclosure, examples of which are illustrated in the appended drawings. The present disclosure may, however, be embodied in many different forms and should not be construed as being limited to the embodiments set forth herein.

FIG. 1 is a block diagram showing an example data system 100 that includes an extensible claim verification system 122 that can provide access to an external claim verification service, according to some embodiments. As shown, the data system 100 includes multiple client devices 102, a server system 108, an external claim verification service system 126, and a network 106 (e.g., including Internet, wide-area-network, local-area-network, wireless network, etc.) that communicatively couples them together. As also shown, the data system 100 includes a data workflow system 124 that can support operation of a data workflow, such as an electronic signature or digital certificate workflow, that relies on verification of a claim via the extensible claim verification system 122. Each client device 102 can host a number of applications, including a client software application 104. Each client software application 104 may communicate data with one or more other instances of the client software application 104, or with the server system 108 via a network 106. Accordingly, each client software application 104 can communicate and exchange data with another client software application 104 and with the server system 108 via the network 106. Additionally, the external claim verification service system 126 can communicate and exchange data with the server system 108 via the network 106. The data exchanged between the client software applications 104, between a client software application 104 and the server system 108, and between the server system 108 and the external software service server can include, without limitation, requests, responses, and authentication data (e.g., authentication token).

The external claim verification service system 126 can host a software application that provides an external claim verification service, which is external to a computing entity (e.g., the client devices 102 or the server system 108) but accessible by the computing entity over the network 106 via a software component. For instance, the extensible claim verification system 122 on the server system 108 can access the external claim verification service provided by the external claim verification service system 126. The extensible claim verification system 122 can comprise one or more computing devices that host the software application providing an external claim verification service.

The server system 108 provides server-side functionality via the network 106 to a particular client software application 104. While certain functions of the data system 100 are described herein as being performed by the extensible claim verification system 122 on the server system 108, it will be appreciated that the location of certain functionality within the server system 108 is a design choice. For example, it may be technically preferable to initially deploy certain technology and functionality within the server system 108, but to later migrate this technology and functionality to the client software application 104 where a client device 102 provides enhanced data object functionality.

The server system 108 supports various services and operations that are provided to the client software application 104 by the extensible claim verification system 122. Such operations include transmitting data from the extensible claim verification system 122 to the client software application 104, receiving data from the client software application 104 to the extensible claim verification system 122, and the extensible claim verification system 122 processing data generated by the client software application 104. This data may include for example, data objects, requests, responses, public/private keys, hash values, access rights data, license data, and authentication data. Data exchanges within the data system 100 may be invoked and controlled through operations of software component environments available via one or more endpoints, or functions available via one or more user interfaces (UIs) of the client software application 104, which may include web-based UIs provided by the server system 108 for presentation at the client device 102.

With respect to the server system 108, each of an API server 110 and a web server 112 is coupled to an application server 116, which hosts the extensible claim verification system 122 and the data workflow system 124. The application server 116 is communicatively coupled to a database server 118, which facilitates access to a database 120 that stores data associated with the application server 116.

The API server 110 receives and transmits data (e.g., API calls, commands, data objects, requests, responses, public/private keys, hash values, access rights data, license data, and authentication data) between the client device 102 and the application server 116. Specifically, the API server 110 provides a set of interfaces (e.g., routines and protocols) that can be called or queried by the client software application 104 in order to invoke functionality of the application server 116. The API server 110 exposes various functions supported by the application server 116 including, without limitation: user registration; login functionality; data object operations (e.g., generating, storing, retrieving, encrypting, decrypting, transferring, access rights, licensing, etc.); interview sessions functionality; business process operations (e.g., starting, generating, etc.); user communications; and calendar functionality.

Through one or more web-based interfaces (e.g., web-based UIs), the web server 112 can support various functionality of the extensible claim verification system 122 of the application server 116 including, without limitation: user registration; login functionality; configuring access to an external claim verification service with respect to the extensible claim verification system 122, and activating or deactivating access to an external claim verification service through the extensible claim verification system 122. Additionally, the web server 112 can provide a set of HTTP endpoints or webhooks that can be called by the client software application 104 or by an external claim verification service provided by the external claim verification service system 126.

The application server 116 hosts a number of applications and subsystems, including the extensible claim verification system 122, which supports various functions and operations with respect to various embodiments described herein. For instance, the extensible claim verification system 122 can support one or more of the following functions: configuring access to an external electronic claim verification service provided by the external claim verification service system 126; receiving a request from a client device 102 for verifying a set of claims for a user by the external electronic claim verification service; based on the configured access to the external electronic claim verification service, responding to the request by causing a user at a client device 102 to be directed to the external electronic claim verification service to verify the set of claims for the user; receiving, from the external electronic claim verification service, a first response relating to verification of the set of claims; and providing, to a client device 102, a second response based on the first response. More regarding various embodiments of a software component relational system is described with respect to FIG. 2.

The application server 116 hosts the data workflow system 124, which can support operation of a data workflow that relies on (or is augmented by) verification of a claim via the extensible claim verification system 122.

The application server 116 is communicatively coupled to a database server 118, which facilitates access to database(s) 120 in which may be stored data associated with the extensible claim verification system 122. Data associated with the extensible claim verification system 122 can include, without limitation: data for configuring access by the extensible claim verification system 122 to an external claim verification service provided by the external claim verification service system 126; transaction information regarding one or more operations performed by the extensible claim verification system 122 (e.g., in connection with a response); and authentication data.

Figure 2:
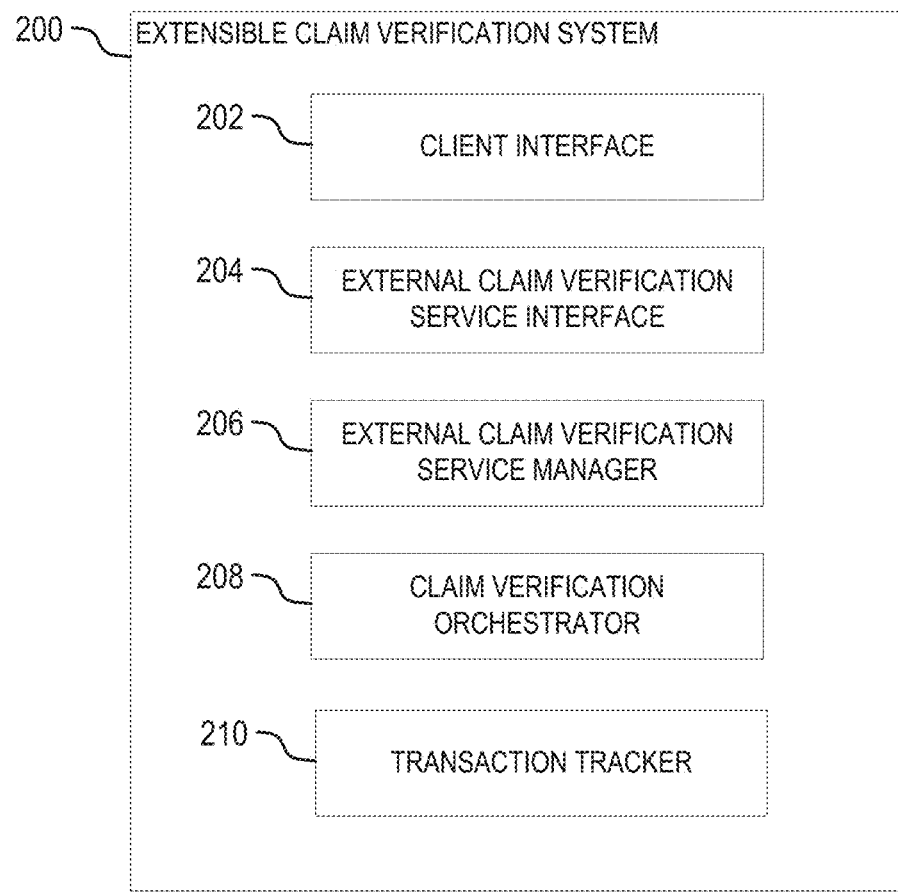
FIG. 2 is a block diagram illustrating an extensible claim verification system, according to some embodiments.

FIG. 2 is a block diagram illustrating an extensible claim verification system 200, according to some embodiments. For some embodiments, the extensible claim verification system 200 implements at least some part of the extensible claim verification system 122 described above with respect to FIG. 1. As shown, the extensible claim verification system 200 comprises a client interface 202, an external claim verification service interface 204, an external claim verification service manager 206, a claim verification orchestrator 208, and a transaction tracker 210. For various embodiments, the components and arrangement of components shown may vary from what is illustrated in FIG. 2. For instance, the extensible claim verification system 200 can include more or fewer components than the components shown in FIG. 2.

The client interface 202 facilitates or supports data communication with a computing device that is operating as a client device and interacting with the extensible claim verification system 200. Likewise, the external claim verification service interface 204 facilitates or supports data communication with a computing device that is operating as provider of one or more external claim verification services (e.g., the external claim verification service system 126) and that is interacting with the extensible claim verification system 200.

The external claim verification service manager 206 facilitates or supports management of a set of external claim verification services accessible through the extensible claim verification system 200, which can include adding, configuring, and removing access to an external claim verification service the extensible claim verification system 200. The external claim verification services can be provided by one or more different external claim verification service systems or different external claim verification service providers. Configuring access to a particular external claim verification service can comprise a user specifying an address (e.g., URL or network address) for an endpoint of the particular external claim verification service, or specifying the version of unified protocol being used to access the particular external claim verification service. For some embodiments, the external claim verification service manager 206 presents a graphical user interface for performing management functions on the extensible claim verification system 200 with respect to an external claim verification service. A user accessing the external claim verification service manager 206 can include an individual user or an admin user associated with an organization using the extensible claim verification system 200 to access one or more external claim verification services, such as an organization that offers or uses a data workflow that relies on claim verification. The user configuring access to an external claim verification service by the extensible claim verification system 200 can be different from a user for whom a claim is being verified. For some embodiments, a client device (e.g., one operating a data workflow) can request a listing of external claim verification services (e.g., via a REST API) that are configured for access through the extensible claim verification system 200 and available for use.

The claim verification orchestrator 208 facilitates or supports operations performed by the extensible claim verification system 200, such as operations relating to requests and responses exchanged between the extensible claim verification system 200 and one or more computing devices (e.g., a client device 102, the data workflow system 124, the external claim verification service system 126) to facilitate use of an external claim verification service as described herein. According to some embodiments, the claim verification orchestrator 208 uses a unified protocol for interacting with an external claim verification service, thereby enabling the extensible claim verification system 200 to provide extensible support (e.g., plug-in support) for external claim verification services of different types and from different providers (e.g., third-party or client-proprietary external claim verification services). Depending on the embodiment, the unified protocol can be based on Security Assertion Markup Language (SAML) (e.g., SAML 2.0) or OpenID (e.g., OpenID Connect 1.0). For some embodiments, the unified protocol can be based on other protocols. For some embodiments, the claim verification orchestrator 208 causes the extensible claim verification system 200 to operate in accordance with the various methodologies discussed herein, such as those described with respect to FIGS. 3 through 6.

The transaction tracker 210 facilitates or supports tracking claim verification request sessions between a client device that is requesting use of an external claim verification service available through the extensible claim verification system 200, and an external claim verification service system that is providing the external claim verification service requested for use. The transaction tracker 210 can record transaction information regarding one or more operations performed by the extensible claim verification system 200 in response to a claim verification request from a client device. Each claim verification request received by the extensible claim verification system 200 can be uniquely associated with a transaction identifier, and the transaction identifier can be used in the transaction information recorded by the transaction tracker 210. The transaction identifier can be used to track a claim request session on the extensible claim verification system 200. Additionally, the transaction tracker 210 can enable the extensible claim verification system 200 enable a lockout status for a particular claim verification request on a lockout threshold, where an enabled lockout status can prevent a user from further attempts to have an external claim verification service verify a claim. Depending on the embodiment, the lockout threshold can be associated with an individual transaction identifier. For instance, for each claim verification request received by the extensible claim verification system 200, the lockout threshold can limit the number of attempts by a user associated with the claim verification request to successfully have a claim verified by the external claim verification service. Additionally, or alternatively, the lockout threshold can be associated with individual external claim verification services that can be accessed by the extensible claim verification system 200. For instance, for each external claim verification service, the lockout threshold can limit the number of claims that can be verified by a given external claim verification service (e.g., limit over a time period, such as a day). In this way, the lockout threshold can throttle the number of claims that the given external claim verification service is requested to verify. The lockout threshold can be configured by a user administrating or managing the extensible claim verification system 200 (e.g., the same user managing the configured access to one or more external claim verification services on the extensible claim verification system 200). For instance, each external claim verification service, each individual relying party, or each individual using the relying party can be associated with its own respective lockout threshold.

Figure 3:
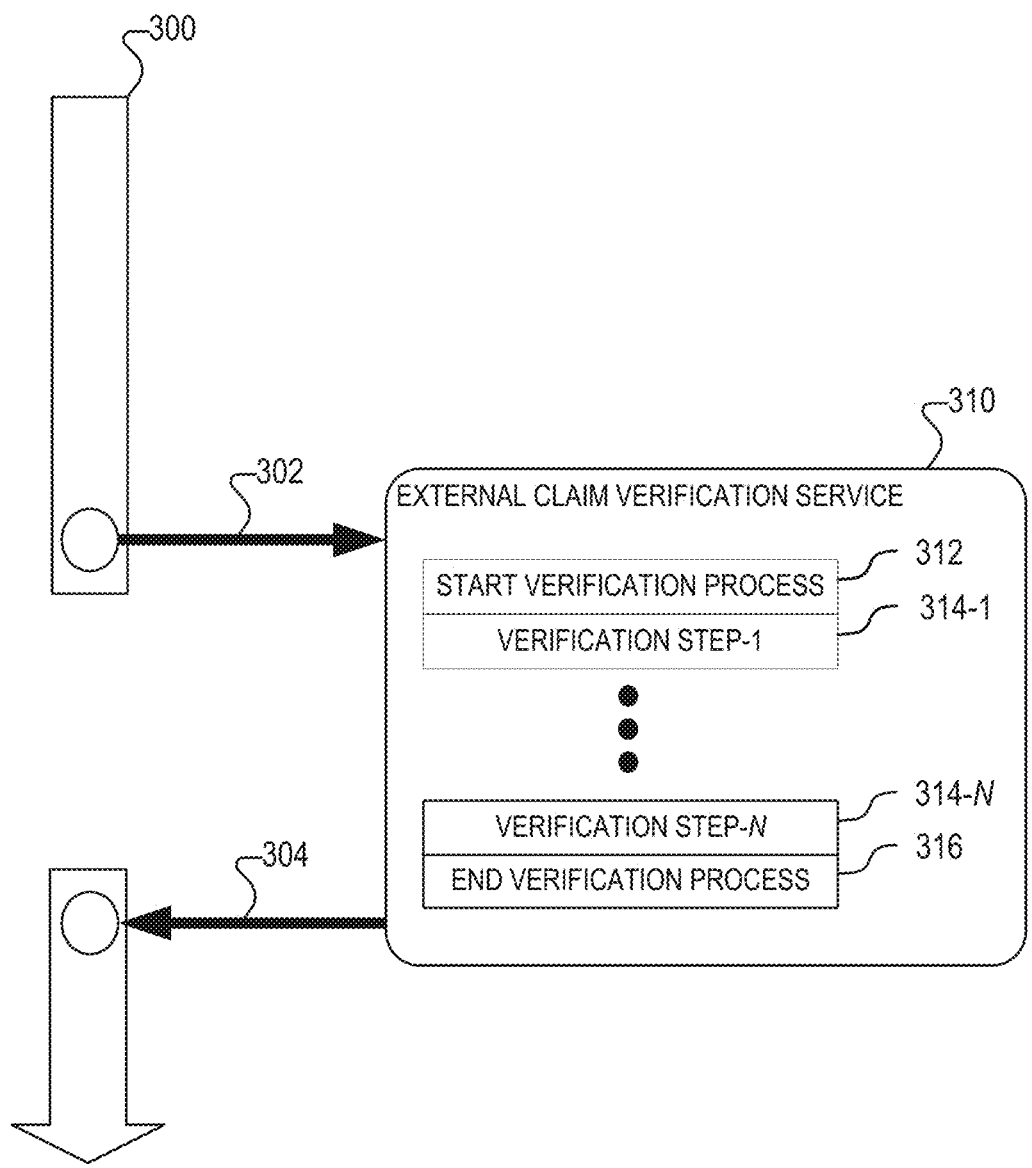
FIG. 3 is a diagram illustrating an example data workflow interfacing with and using an example external claim verification service, according to some embodiments.

FIG. 3 is a diagram illustrating an example data workflow 300 interfacing with and using an example external claim verification service 310, according to some embodiments. In particular, by use of various embodiments described herein (e.g., the extensible claim verification system 122 or 200), the data workflow 300 can use the external claim verification service 310 to verify a set of claims for a user. The data workflow 300 can represent, for example, an electronic signing workflow that permits a user to electronically sign a document. The external claim verification service 310 can represent one being provided by an external claim verification service system (e.g., 126). For some embodiments, in response to a request from a client device operating the data workflow to verify a set of claims for a user, at operation 302 an extensible claim verification system described herein causes a user to be directed (e.g., redirected from the extensible claim verification system) to the external claim verification service 310. The extensible claim verification system can provide the external claim verification service 310 (e.g., with the redirection) a request specifying the set of claims to be verified by the external claim verification service 310.

Once the user is directed to the external claim verification service 310, a verification process 312 can start and execute one or more verification steps 314-1 through 314-N with respect to the user, which can cause the user to perform a set of actions (e.g., interactions) with respect to the external claim verification service 310 (e.g., through a graphic user interface). For instance, verification step 314-1 can comprise an authentication step, whereby the user authenticates with the external claim verification service 310 using user credentials (e.g., username and password). For some embodiments, the external claim verification service 310 only provides the extensible claim verification system with a response upon the user successfully completing each of the verification steps 314-1 through 314-N. For various embodiments, how the user completes the verification steps 314-1 through 314-N can determine whether at least some or all of the set of claims are successfully verified. Though not illustrated with respect to the data workflow 300, some embodiments support requesting multiple claims from multiple external claim verification services. For example, a user can be redirected to the external claim verification service 310, the user can be redirect back to the data workflow 300 after the external claim verification service 310 has fulfill a claim request, and the data workflow 300 can redirect the user to another external verification service to fulfill another claim request. This can continue until all claim request for the data workflow 300 are fulfilled, at which point claim values can be returned to a relying party.

Eventually, at operation 304, the external claim verification service 310 causes the user to be directed (e.g., redirected from the external claim verification service 310) back to the extensible claim verification system. The external claim verification service 310 can also send a response with the redirection) to the extensible claim verification system, which can comprise data regarding verification of the set of claims by the external claim verification service 310. This response can be signed by the external claim verification service 310 (e.g., using its private key), thereby ensuring the integrity of the response. After the extensible claim verification system receives a response (at operation 304), the data workflow 300 may resume operation based on the data provided in the response. For instance, the extensible claim verification system can provide a response to a client device operating the data workflow 300 and, based on that response, the client device may or may not resume operation of the data workflow 300.

For some embodiments, the extensible claim verification system and the external claim verification service 310 use a unified protocol based on SAML to interact with each other. For instance, using a unified protocol based on SAML 2.0, the extensible claim verification system can redirect a user to the external claim verification service 310 and send the external claim verification service 310 a claim verification request by using a POST or GET method with an AuthN-Request request at operation 302, and the external claim verification service 310 can eventually redirect the user back to the extensible claim verification system and send a response to the extensible claim verification system by using use a POST method with a SAML Response at operation 304. Depending on the embodiments, a SAML request or SAML response can comprise values for one or more of the following attributes.

Issuer string: A unique identifier associated with the provider of an external claim verification service (e.g., 310), which can be included in SAML responses.

Assertion Consumer URL: This is where the extensible claim verification system will direct (e.g., redirect) users to start the authentication request.

SAML Attribute Name: This will be the attribute that the extensible claim verification system will look for in the SAML response from an external claim verification service (e.g., 310). This could be, for example, an email address or a simple result code that states a verification pass or fail.

Certificate: This certificate will be used by the extensible claim verification system to verify the signature of a signed SAML response from an external claim verification service (e.g., 310).

For some embodiments, the extensible claim verification system and the external claim verification service 310 use a unified protocol based on OpenID Connect to interact with each other. For instance, using a unified protocol based on OpenID Connect 1.0, the extensible claim verification system can redirect a user to the external claim verification service 310 and send the external claim verification service 310 a claim verification request by using a GET method with a redirect_uri request at operation 302, and the external claim verification service 310 can eventually redirect the user back to the extensible claim verification system and a response to the extensible claim verification system by using use a POST method with a callback at operation 304. Depending on the embodiments, the redirect_uri request at request operation 302 can comprise a query string with values for one or more of the following example parameters.

code: An authorization code (e.g., OAuth authorization code), which can be used with an authentication token (OAuth token) endpoint of a client device/data workflow to retrieve an access token or ID token.

claim_request: Describes a set of claims (e.g., identity claims) that are being requested for verification by an external claim verification service (e.g., 310). This can comprise a JSON Web Token (JWT) having body with values for one or more of the following attributes:

iss=Identifier associated with the extensible claim verification system.

iat=Issued at timestamp.

exp=Expiration timestamp, for when this JWT should be considered invalid by the external claim verification service (e.g., 310).

session_id=A transaction identifier (e.g., key) for identifying this particular transaction with a request from a client device.

requested_claims=A set of claims that the extensible claim verification system is requesting an external claim verification service (e.g., 310) to verify. For instance, to a request to verify someone's full name of "Darren H K Louie," this attribute set as follows can be used:

```
"requested claims": {
    "identity_verified_fullname": {
        "essential": true,
        "input_options": [
            {
                "option_name":
                "expected_fullname",
                "option_value": {
                    "string_value": "Darren H K
                    Louie"
                }
            }
        ]
    }
},
```

The use of a JWT in a request from an extensible claim verification system represents an example of some embodiments using an authentication token embedded with claim identifiers. Depending on the embodiments, the callback at operation 304 can comprise values for one or more of the following example parameters:

claim_response: This can be signed by a key (e.g., private key) associated with the external claim verification service (e.g., 310). This can comprise a Jason Web Token (JWT) having body with values for one or more of the following attributes:

claims=The exact claims that were requested and verified by the external claim verification service (e.g., 310). For instance, in response to the example request described earlier:

```
"claims": {
    "identity_verified_fullname": "Darren H K Louie"
}
``` iat=Issued at timestamp.

exp=Expiration of this response and when the extensible claim verification system should consider this response (e.g., to prevent replay attacks).

iss=Identifier associated with the external claim verification service (e.g., 310).

session_id=The transaction identifier (e.g., key) associated with the request that this response is responding to, which can mitigate reply attacks and can also mitigate playing a successful claim response against a different session on the client device than the system intended. This transaction identifier can correlate to a matching protected (e.g., signed) session identifier that the system asks that the client device also provide to complete the request.

The use of a JWT in a response from an external claim verification service represents an example of some embodiments using an authentication token embedded with a claim value or a claim verification value.

Though certain embodiments are described herein as using SAML or OpenID Connect, various embodiments can use different or alternative technologies to implement the methodologies described herein.

Figure 4:
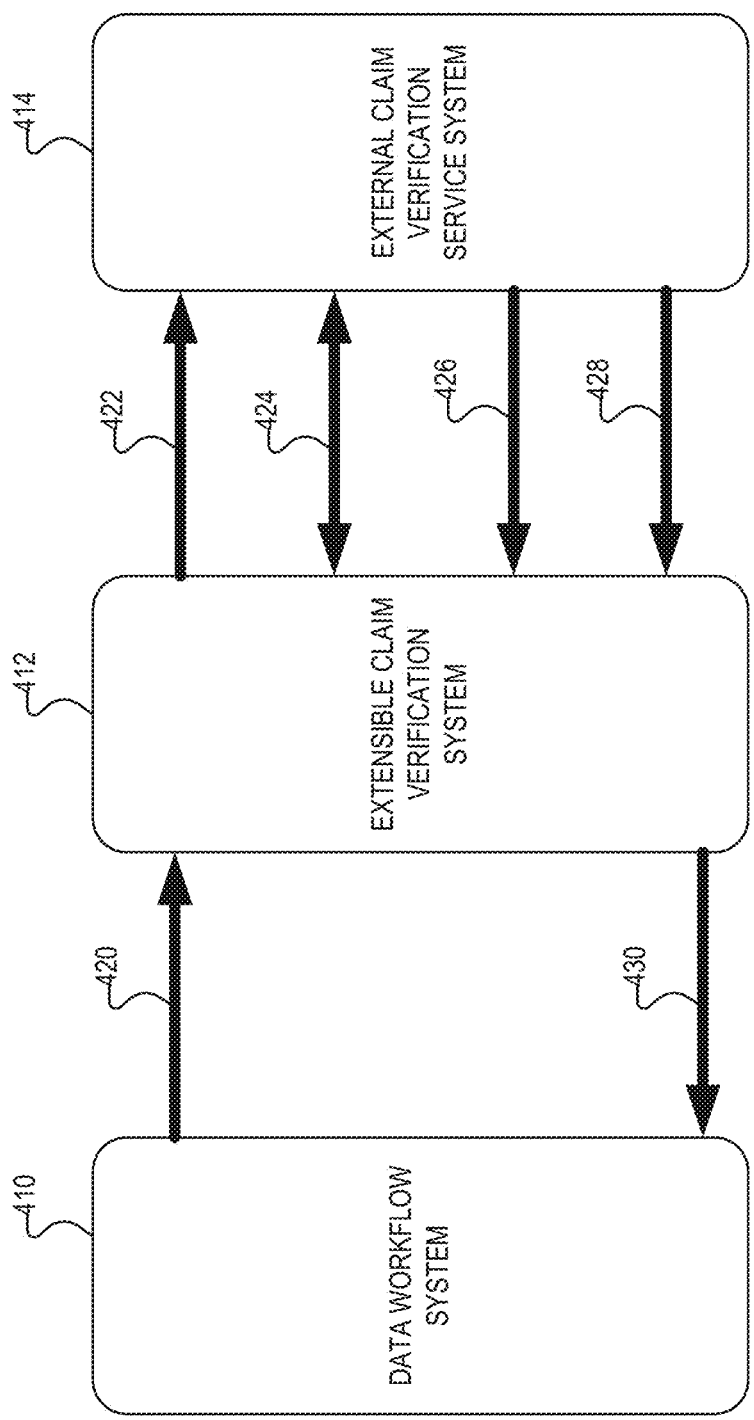
FIG. 4 is a diagram illustrating example data interactions with an example extensible claim verification system, according to some embodiments.

FIG. 4 is a diagram illustrating example data interactions with an example extensible claim verification system 412, according to sonic embodiments. In particular, FIG. 4 illustrates data interactions between the extensible claim verification system 412 and a data workflow system 410, and the extensible claim verification system 412 and an external claim verification service system 414. For some embodiments, the external claim verification service system 414 supports or provides an external claim verification service for access and use by the extensible claim verification system 412. The data workflow system 410 can operate or support operation of a data workflow (e.g., an electronic signature or digital certificate workflow) that relies on a set of claims to be verified by an external claim verification service. With respect to the extensible claim verification system 412, the data workflow system 410 could serve as a client device and the external claim verification service system 414 could serve as an external claim verification provider (e.g., external identity verification provider). For some embodiments, the extensible claim verification system 412 is similar to other extensible claim verification systems described herein (e.g., 122 and 200).

During operation, at operation 420, the data workflow system 410 sends a request to the extensible claim verification system 412 to verify of a set of claims for a particular user by an external claim verification service provided by the external claim verification service system 414. Additionally, the request can include a request to authenticate the particular user for the data workflow system 410, which may permit the particular user to log into the data workflow system 410 and access a particular data workflow. In this way, the extensible claim verification system 412 can serve as an account system/server for handling authentication for the data workflow system 410. In response to the request from the data workflow system 410, the extensible claim verification system 412 can request that the particular user consent to the extensible claim verification system 412, the external claim verification service system 414, or both, accessing data (e.g., claim values) relating to the particular user. Upon the particular user consenting, the extensible claim verification system 412 can proceed with servicing the request.

For some embodiments, operation 420 involves the data workflow system 410 using a POST method or a GET method to request the extensible claim verification system 412 (through identity/auth endpoint thereof) to authenticate the particular user. Depending on the embodiments, the request can comprise values for one or more of the following example parameters, which can be based on an OpenID Connect:

client_id: An identifier associated with the data workflow system (e.g., 410).

redirect_uri: A redirect universal resource indicator (URI) for the data workflow system (e.g., 410).

request: A request object that describes the particular user being authenticated, and specifies a set of claims to be verified via the extensible claim verification system (e.g., 412). The request object can comprise a token (e.g., signed binary-serialized token) with one or more of the following example parameters:
- Data Workflow Identifier(s): One or more identifiers associated with a data workflow involving the particular user.
- UserId: Identifier associated with the particular user.
- UserSiteId: A site identifier, in case the same UserID exists in multiple sites.
- Issued: The time at which the token was issued, which can determine when the token expired (e.g., token expires 5 minutes after issuance).
- claims: A set of claims that the data workflow system (e.g., 410) is requesting the extensible claim verification system (e.g., 412) to verify using an external claim verification service of the external claim verification service system (e.g., 414). This parameter can be based on to the "claim" of OpenID Connect. Additionally, this parameter can comprise an encoded claim request object, which can comprise one or more of the following example parameters:
  - Id_token: An identifier associated with the ID token in which claim values are to be returned.
  - Claim_name: An identifier for a claim for which verification is requested. The identifier can comprise, for example, a claim name or label.
  - Provider: An identifier associated with the external claim verification service or provider that is being requested to verify the specified claim via the extensible claim verification system (e.g., 412).

The following is an example of how values of these parameters can be stored in a claim request object of operation 420.

```
{
    "id_token": {
        "claim_name": {
            "provider": string,
        }
    }
}
```

At operation 422, the extensible claim verification system 412 causes the particular user to be directed (redirected) from the extensible claim verification system 412 to the external claim verification service system 414 and, in turn, the external claim verification service system 414 can attempt to authenticate the particular user (e.g., based on user credentials provided by the particular user). The particular user can be directed to the external claim verification service system 414 with a request for the external claim verification service system 414 to verify at least one of the claims (in the set of claims) using an external claim verification provided by the external claim verification service system 414. The particular user can be prompted for consent to use the external claim verification service (e.g., if the service is operated by a third-party relative to the system 414).

At operation 424, the external claim verification service system 414 and the extensible claim verification system 412 can exchange code (e.g., OAuth authorization codes) for an access token or identifier token. Once the external claim verification service system 414 receives an access/identifier token from the extensible claim verification system 412 (using the exchange code), the external claim verification service system 414 can access APIs (e.g., REST APIs) available on the extensible claim verification system 412, which can permit the verification process on the external claim verification service system 414 to continue.

At operation 426, the external claim verification service system 414 calls on the extensible claim verification system 412 to continue authentication of the particular user on the extensible claim verification system 412. For instance, the external claim verification service system 414 can call a REST API of the extensible claim verification system 412 (e.g., based on access granted by the access/identifier token received by operation 424) to complete an authentication challenge on the extensible claim verification system 412.

At operation 428, the external claim verification service system 414 causes the particular user to be directed (redirected) back from the external claim verification service system 414 to the extensible claim verification system 412. The particular user can be directed back to the extensible claim verification system 412 with a response that comprises at least one claim verification value for at least one claim requested to be verified at operation 422. The response from the external claim verification service system 414 to the extensible claim verification system 412 can comprise an authentication token, which can further be embedded with one or more values that verify the set of claims (specified at operation 422). The authentication token can indicate successful authentication of the particular user by the external claim verification service system 414.

At operation 430, the extensible claim verification system 412 sends a response to the data workflow system 410 that at least indicates whether the particular user was successfully authenticated by the extensible claim verification system 412. The response can comprise one or more values that verify the set of claims requested for verification at operation 420. Additionally, the response can comprise the values of the set of claims. The extensible claim verification system 412 generates the response (sent at operation 430) based on the response the extensible claim verification system 412 receives from the external claim verification service system 411. For instance, the extensible claim verification system 412 can condition successful authentication of the particular user by the extensible claim verification system 412 on whether the response from the external claim verification service system 414 (at operation 428) indicates that authentication of the particular user was successful by the external claim verification service system 414, or whether the set of claims (requested for verification at operation 422) was successfully verified by the external claim verification service system 414. Additionally, at least one of the values verifying the set of claims can originate from a value provided in the response from the external claim verification service system 414 to the extensible claim verification system 412 (at operation 428). The response from the extensible claim verification system 412 to the data workflow system 410 can comprise an authentication token, which can further be embedded with one or more values that verify the set of claims (specified at operation 420). The authentication token can indicate successful authentication of the particular user by the extensible claim verification system 412, and can be configured to authenticate the particular user at the data workflow system 410.

For some embodiments, operation 430 involves the extensible claim verification system 412 using a POST method to send a response comprising an authentication/identifier token to the data workflow system 410 to authenticate the particular user at the data workflow system 410. Depending on the embodiments, the token can comprise values for one or more of the following parameters, which can be based on an OpenID Connect ID Token:

claim_name: An identifier for a claim for which a verification response is provided. The identifier can comprise, for example, a claim name or label.

value: A value or verification value provided (e.g., by the external claim verification service of system 414) for the claim specified by claim_name.

provider: An identifier associated with the external claim verification service or provider that provides verification of the specified claim via the extensible claim verification system (e.g., 412).

acquired_time: Timestamp at which the claim value or claim verification value was obtained from the external claim verification service via the extensible claim verification system (e.g., 412).

The following is an example of how values of these parameters can be stored in a response of operation 430.

```
"claim_name":
{
    "value": value,
    "provider": "string",
    "acquired_time": uint
}
```

Figure 5:
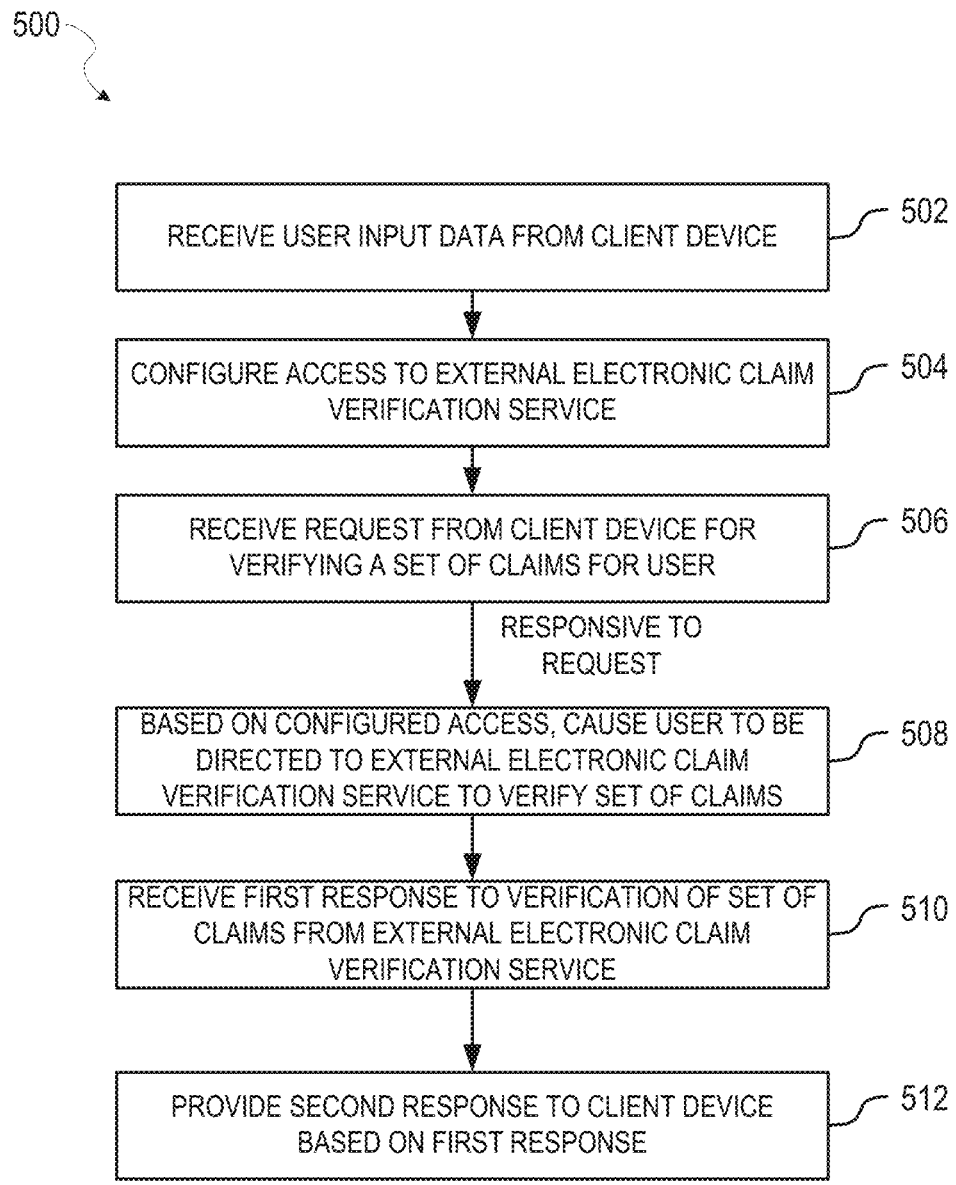
FIGS. 5 and 6 are flowcharts illustrating example methods for extensible claim verification, according to some embodiments.
Figure 6:
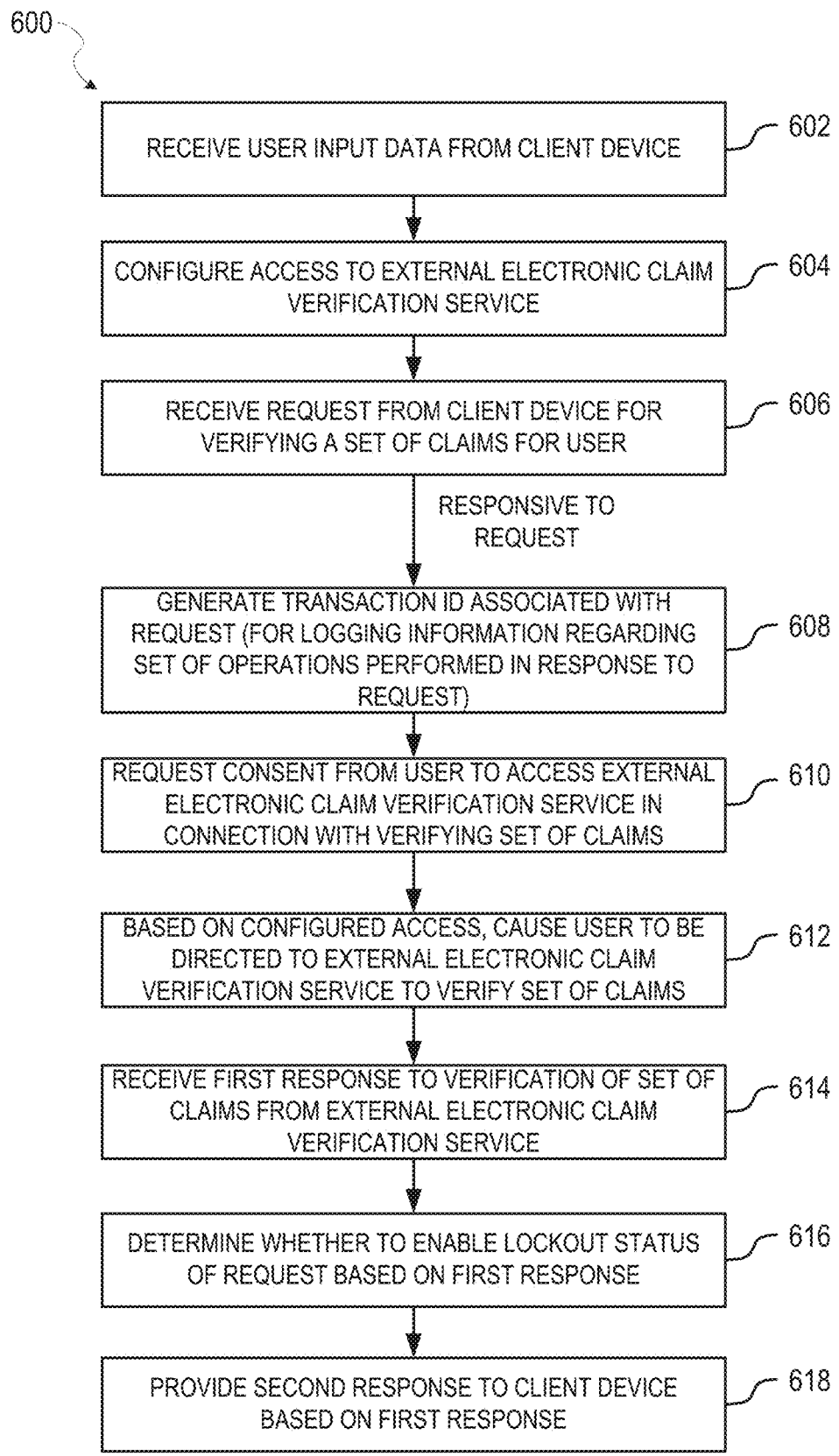

FIGS. 5 and 6 are flowcharts illustrating example methods for extensible claim verification, according to some embodiments. It will be understood that example methods described herein can be performed by a machine in accordance with some embodiments. For example, any one of the methods 500, 600 can be performed by the extensible claim verification system 200 described above with respect to FIG. 2. An operation of various methods described herein can be performed by a hardware processor (e.g., a central processing unit or graphics processing unit) of a computing device (e.g., a desktop, server, laptop, mobile phone, tablet, etc.), which can be part of a computing system based on a cloud architecture. Example methods described herein may also be implemented in the form of executable instructions stored on a machine-readable medium or in the form of electronic circuitry. For instance, the operations of a method 500 of FIG. 5 can be represented by executable instructions that, when executed by a processor of a computing device, cause the computing device to perform the method 500. Depending on the embodiment, an operation of an example method described herein can be repeated in different ways or involve intervening operations not shown. Though the operations of example methods can be depicted and described in a certain order, the order in which the operations are performed may vary among embodiments, including performing certain operations in parallel.

Referring now to FIG. 5, the method 500 begins with operation 502 receiving, at the extensible claim verification system (e.g., 200), user input data from a client device, where the user input data can relate to adding (or removing) access of an external claim verification service (e.g., provided by the external claim verification service system 126) by an extensible claim verification system. According to some embodiments, the extensible claim verification system (e.g., 200) presents a user with a graphical user interface, such as one similar to a graphical user interface 700 illustrated by FIG. 7. Subsequently, at operation 504, the extensible claim verification system (e.g., 200) can configure access to the external claim verification service (e.g., of 126) based on the user input data.

At operation 506, the extensible claim verification system (e.g., 200) receives a request from a client device (e.g., one different from the client device involved in operation 502) for verifying a set of claims for a user. According to some embodiments, a claim of the set of claims comprises an asserted data value regarding the user that is to be verified by the external electronic claim verification service. The data value can represent an assert of information regarding the user, such as identity information (e.g., social security number, passport number, etc.) or residential user. For some embodiments, the request is associated with an electronic signature or digital certificate workflow operating on the client device, such as a data workflow for the user to electronically sign a document.

In response to the request, at operation 508, the extensible claim verification system (e.g., 200) causes the user to be directed (e.g., redirected) to the external claim verification service based on the configured access to verify the set of claims. The external electronic claim verification service can cause the user to perform a set of actions (e.g., steps with respect to the external electronic verification service) to verify the set of claims for the user. For some embodiments, causing the user to be directed to the external electronic claim verification service comprises using a universal resource locator-based redirection to the external electronic claim verification service. Additionally, for some embodiments, causing the user to be directed to the external electronic claim verification service comprises providing the external electronic claim verification service with the set of claims to be verified for the user.

At operation 510, the extensible claim verification system (e.g., 200) receives from the external claim verification service (e.g., of 126) a first response relating to verification of the set of claims. The first response can comprise a claim verification value that indicates whether the asserted data value for a claim (in the set of claims) has been verified (e.g., whether verification was successful or not). For example, the asserted data value can comprise information associated with identifying the user, thereby facilitating identity verification of the user. The first response can comprise a data value for a claim (in the set of claims) specified by the request received at operation 506, thereby enabling the client device to obtain the data value for the claim from the external claim verification service (e.g., of 126). For instance, for a claim regarding the e-mail address of the user, the first response can comprise a data value that specifies a verified e-mail address of the user. Additionally, the first response can comprise a result of the user authenticating with the external electronic claim verification service (e.g., of 126). For some embodiments, the first response comprises an authentication token, such as an access token or an ID token generated by a user authenticating with the external electronic claim verification service. Additionally, for some embodiments, the authentication token of the first response is embedded with a claim value or a claim verification value for at least one claim in the set of claims. For some embodiments, the first response is signed by the external claim verification service (e.g., using a private key of the external claim verification service). Additionally, for some embodiments, the transaction identifier is used to store data that has been verified based on the first response, thereby providing persistent evidence that proves that the verification has occurred.

At operation 512, the extensible claim verification system (e.g., 200) provides (e.g., sends) to the client device a second response based on the first response received at operation 506. Where the first response (at operation 506) comprises a claim verification value (e.g., verification passed or failed, or copy of the value of a claim) for at least one claim in the set of claims, the second response provided to the client device (at operation 512) can comprise the claim verification value for the at least one claim in the set of claims. For some embodiments, the second response is signed by the extensible claim verification system (e.g., using a private key of the extensible claim verification system). For some embodiments, the second response comprises an authentication token, such as an access token or an ID token generated by a user authenticating with the extensible claim verification system (e.g., 200). Further, for some embodiments, the authentication token of the second response is embedded with a claim verification value for at least one claim in the set of claims (as provided from the first response from the external electronic claim verification service). The authentication token of the second response can be configured to authenticate the user at the client device, which in turn can facilitate authenticated access by the user of a data workflow operating on the client device. For some embodiments, the second response is signed by the external claim verification service (e.g., using a private key of the extensible claim verification system).

Referring now to the FIG. 6, the method 600 begins with operations 602 through 606, which, according to some embodiments, are respectively similar to operations 502 through 506 described above with respect to the method 500 of FIG. 5. The method 600 continues with operation 608, where in response to the request received at operation 606, the extensible claim verification system (e.g., 200) generates a transaction identifier (ID) associated with the received request. The transaction identifier can be generated based on an identifier associated with a data workflow (operating on the client device) that is relying on a response (second response provided at operation 618) from the extensible claim verification system (e.g., 200).

According to some embodiments, the extensible claim verification system (e.g., 200) logs, in a data structure (e.g., database), information regarding a set of operations performed by the extensible claim verification system (e.g., 200) in response to the received request at operation 606. The transaction information logged in the data structure can comprise the transaction identifier generated at operation 608 in associated with the request. Additionally, the transaction information logged in the data structure can comprise a requester client identifier associated with the client device (that sent the request received at operation 606) and an external claim verification service identifier associated with the external claim verification service identifier (to which access was configured at operation 604). Depending on the embodiment, the information stored within the data structure can be used for auditing operations performed by the extensible claim verification system. The following illustrates the structure of an example of a table that can be stored within the data structure.

| Column Name | Type | Description |
| --- | --- | --- |
| EntryId | Guid | The primary key for the table |
| TransactionId | String | The transaction ID that this audit entry is for |
| RequestorClientId | Guid | The client ID of the requesting client |
| ClaimId | Integer | The foreign key of the external claim being requested |
| ClaimProviderId | Guid | The client ID of the external claim provider |
| UserId | Guid | The user ID of the user being authenticated |
| EventTime | DateTime | The UTC DateTime of the audit event |

At operation 610, the extensible claim verification system (e.g., 200) requests consent from the user to access the external electronic claim verification service (e.g., of 126) in connection with verifying the set of claims for the user. For some embodiments, the consent is facilitated by the extensible claim verification system (e.g., 200) presenting the user with a graphical user interface that solicits the user's permission to use the external electronic claim verification service to verify the set of claims or access, which can involve the external electronic claim verification service accessing data (e.g., identity data) associated with the user.

The method 600 continues with operations 612 and 614, which, according to some embodiments, are respectively similar to operations 508 and 510 described above with respect to the method 500 of FIG. 5. At operation 616, the extensible claim verification system (e.g., 200) determines whether to enable a lockout status of the request based on the first response received at operation 614. For some embodiments, the determining at operation 616 comprises determining whether the first response (received at operation 606) indicates that the user failed to access the external electronic claim verification service. In response to determining that the first response indicates that the user failed to access the external electronic claim verification service, the extensible claim verification system (e.g., 200) can determine whether the user transgressed a lockout threshold for accessing the external electronic claim verification service, and if so (e.g., attempts to verify the set of claims have been exhausted), may enable a lockout status for the request. Once the lockout status of the request is enabled, the extensible claim verification system (e.g., 200) can prevent a user from further attempts to verify the set of claims via the external electronic claim verification service (e.g., of 126). Additionally, if the external electronic claim verification service (e.g., of 126) sends the first response (received at operation 614) after the lockout status is enabled, the extensible claim verification system (e.g., 200) can ignore the first response. Depending on the embodiment, the lockout threshold can be associated with the request received at operation 606. For instance, based on a transaction identifier, the extensible claim verification system (e.g., 200) can track how many attempts to verify claims are performed for a given request (received at operation 606), and each transaction identifier is allowed a configurable number of attempts to verify the set of claims. Alternatively, or additionally, the lockout threshold can be associated with the external electronic claim verification service (e.g., of 126). For instance, the lockout threshold can be based on a limit intended to throttle (e.g., over a period of time, such an hour or a day) how many requests to verify a claim are sent to a particular external electronic claim verification service.

The method 600 continues with operation 618, which, according to some embodiments, is respectively similar to operation 512 described above with respect to the method 500 of FIG. 5.

Figure 7:
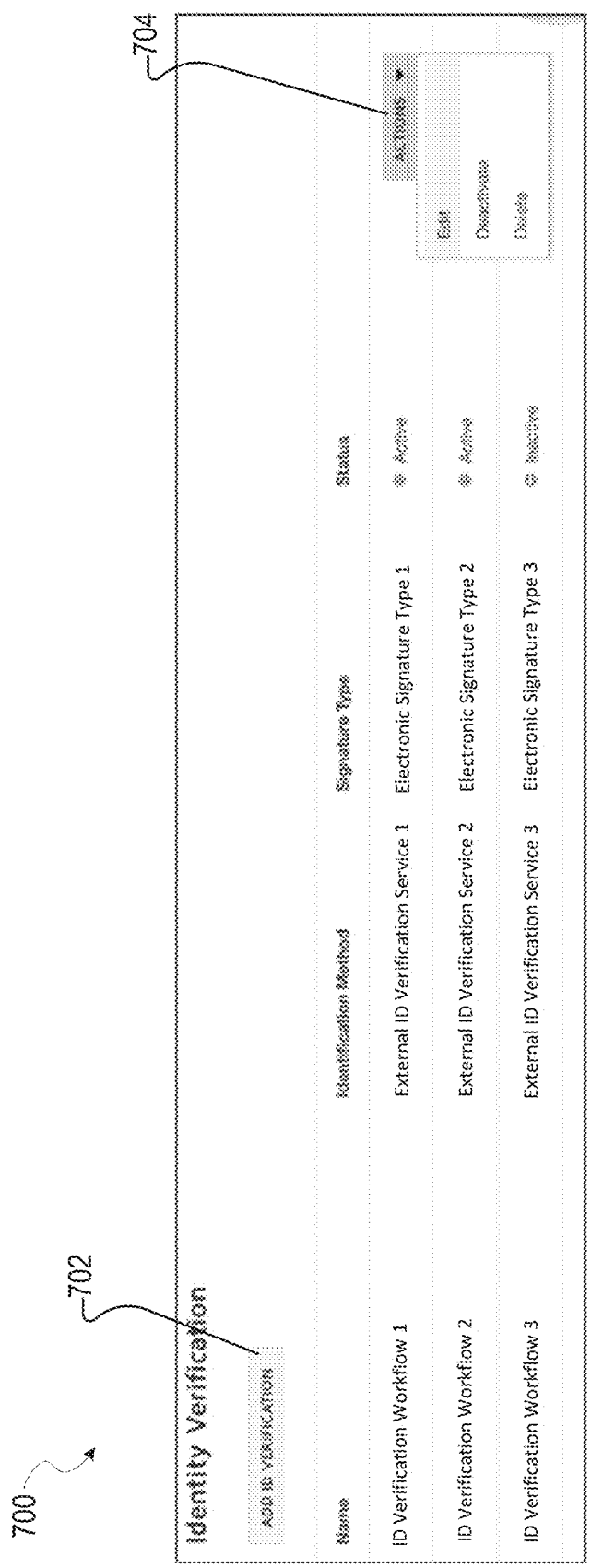
FIG. 7 presents a screen shot of an example graphical user interface (GUI) for managing one or more external claim verification services, according to some embodiments.

FIG. 7 presents a screen shot of an example graphical user interface (GUI) 700 for managing one or more external claim verification services, according to some embodiments. The GUI 700 can be one generated or otherwise presented by an extensible claim verification system (e.g., 200) to add or remove access to an external claim verification service by the extensible claim verification system. As shown, the GUI 700 comprises a listing of identity (ID) verification workflows (ID verification workflows 1, 2, and 3) configured on an extensible claim verification system (e.g., 122, 200), each of which is configured with access to an external claim verification service (external ID verification services 1, 2, and 3 respectively) and associated with an electronic signature or digital certificate workflow. As shown, a graphical button 702 can permit a user to add a new ID verification workflow that has configured access to an external claim verification service, as described herein. As also shown, a graphical element 704 can permit a user to edit, deactivate, or remove an ID verification workflow listed on the GUI 700. The GUI 700 presents a status (e.g., active/inactivate) for each ID verification workflow.

Figure 8:
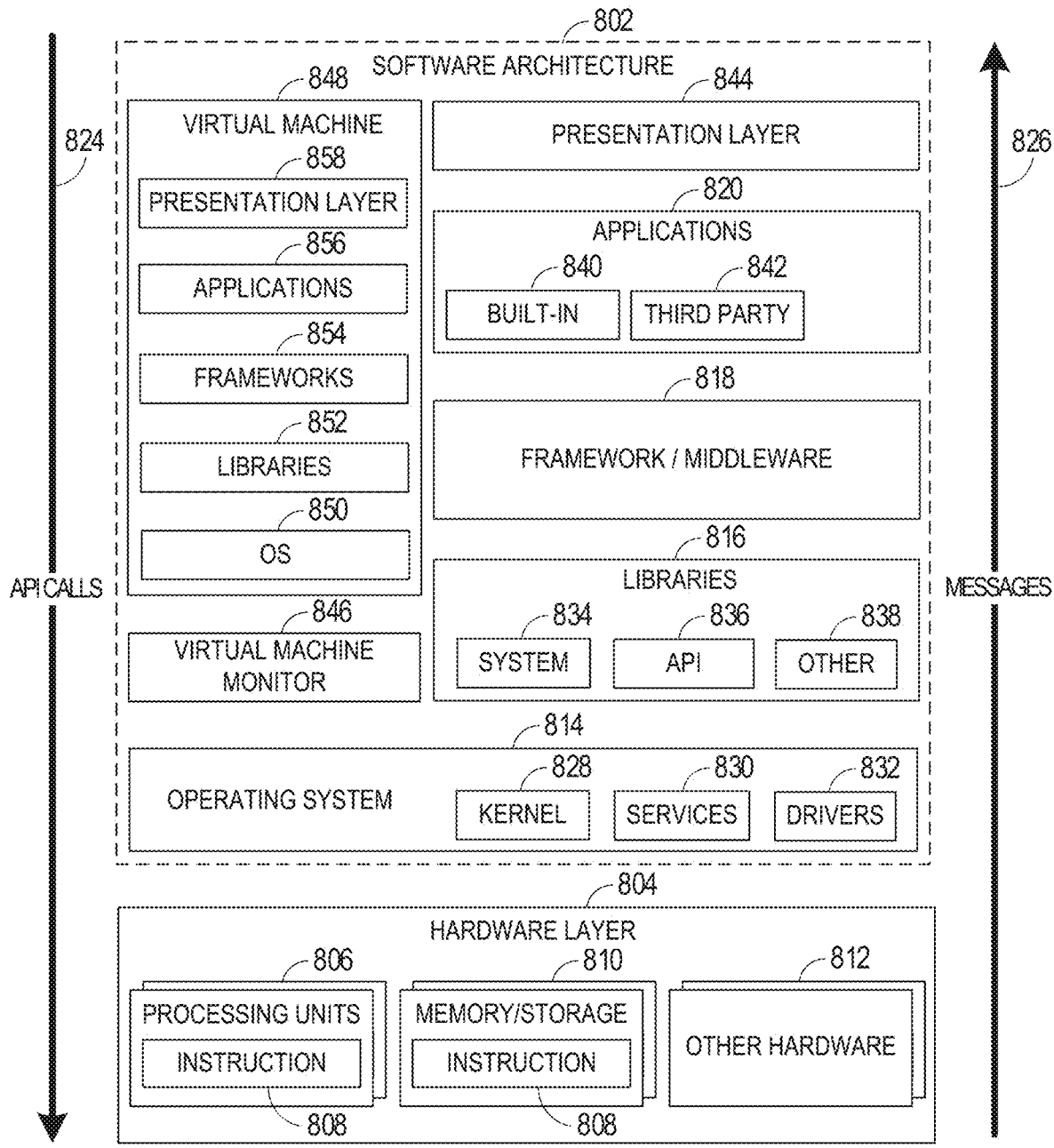
FIG. 8 is a block diagram illustrating a representative software architecture, which may be used in conjunction with various hardware architectures herein described, according to various embodiments of the present disclosure.
Figure 9:
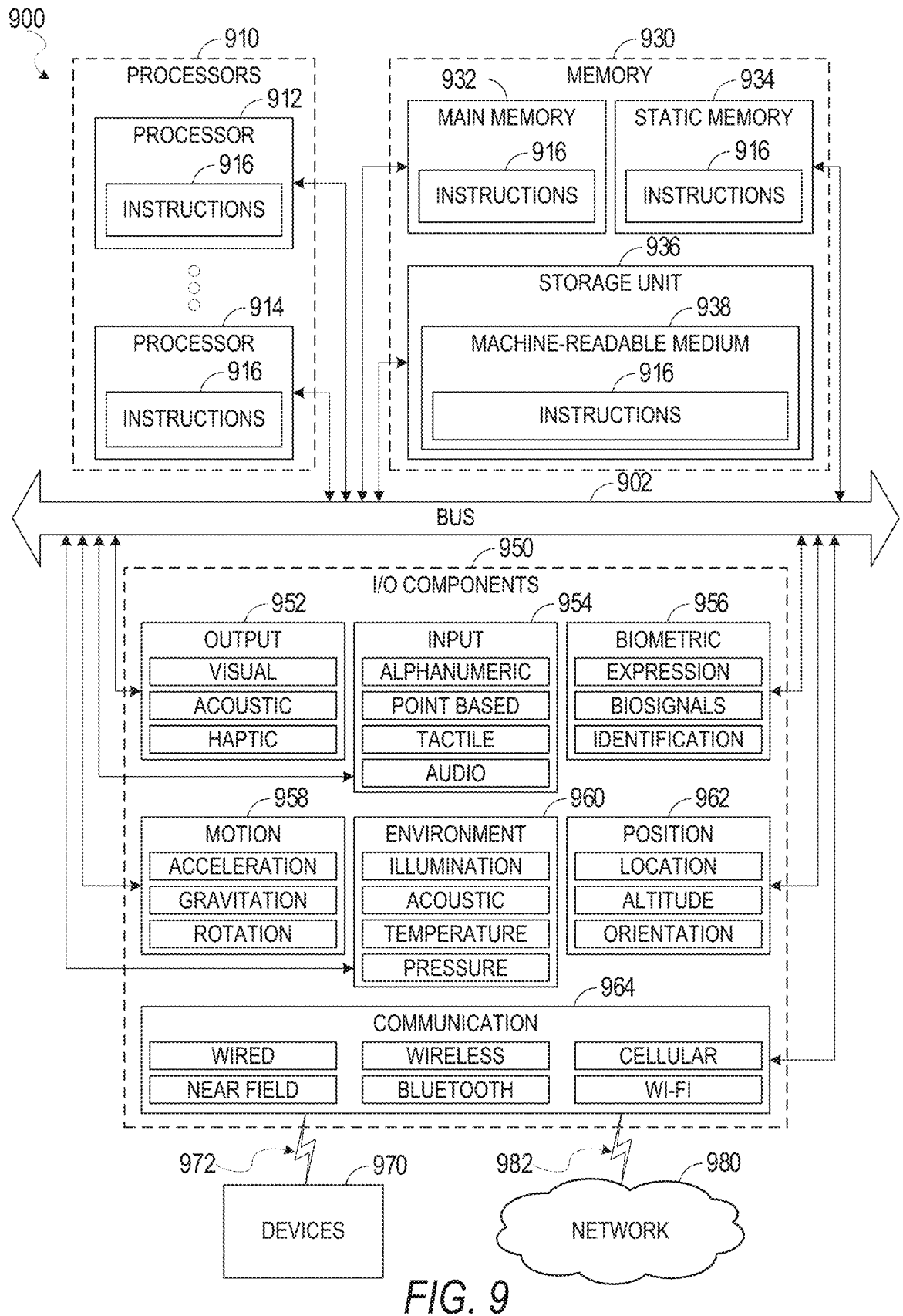
FIG. 9 is a block diagram illustrating components of a machine able to read instructions from a machine storage medium and perform any one or more of the methodologies discussed herein according to various embodiments of the present disclosure.

Various embodiments described herein can be implemented by way of the example software architecture illustrated by and described with respect to FIG. 8 or by way of the example machine illustrated by and described with respect to FIG. 9.

FIG. 8 is a block diagram illustrating an example of a software architecture 802 that can be installed on a machine, according to some example embodiments. FIG. 8 is merely a non-limiting example of a software architecture, and it will be appreciated that many other architectures can be implemented to facilitate the functionality described herein. The software architecture 802 can be executing on hardware such as a machine 900 of FIG. 9 that includes, among other things, processors 910, memory 930, and I/O components 950. A representative hardware layer 804 is illustrated and can represent, for example, the machine 900 of FIG. 9. The representative hardware layer 804 comprises one or more processing units 806 having associated executable instructions 808. The executable instructions 808 represent the executable instructions of the software architecture 802, including implementation of the methods, modules, and so forth of FIGS. 1-6. The hardware layer 804 also includes memory or storage modules 810, which also have the executable instructions 808. The hardware layer 804 may also comprise other hardware 812, which represents any other hardware of the hardware layer 804, such as the other hardware illustrated as part of the machine 900.

In the example architecture of FIG. 8, the software architecture 802 can be conceptualized as a stack of layers, where each layer provides particular functionality. For example, the software architecture 802 may include layers such as an operating system 814, libraries 816, frameworks/middleware 818, applications 820, and a presentation layer 844. Operationally, the applications 820 or other components within the layers may invoke API calls 824 through the software stack and receive a response, returned values, and so forth (illustrated as messages 826) in response to the API calls 824. The layers illustrated are representative in nature, and not all software architectures have all layers. For example, some mobile or special-purpose operating systems may not provide a frameworks/middleware 818 layer, while others may provide such a layer. Other software architectures may include additional or different layers.

The operating system 814 may manage hardware resources and provide common services. The operating system 814 may include, for example, a kernel 828, services 830, and drivers 832. The kernel 828 may act as an abstraction layer between the hardware and the other software layers. For example, the kernel 828 can be responsible for memory management, processor management (e.g., scheduling), component management, networking, security settings, and so on. The services 830 may provide other common services for the other software layers. The drivers 832 can be responsible for controlling or interfacing with the underlying hardware. For instance, the drivers 832 may include display drivers, camera drivers, Bluetooth® drivers, flash memory drivers, serial communication drivers (e.g., Universal Serial Bus (USB) drivers), drivers, audio drivers, power management drivers, and so forth depending on the hardware configuration.

The libraries 816 may provide a common infrastructure that can be utilized by the applications 820 and/or other components and/or layers. The libraries 816 typically provide functionality that allows other software modules to perform tasks in an easier fashion than by interfacing directly with the underlying operating system 814 functionality (e.g., kernel 828, services 830, or drivers 832). The libraries 816 may include system libraries 834 (e.g., C standard library) that may provide functions such as memory allocation functions, string manipulation functions, mathematic functions, and the like. In addition, the libraries 816 may include API libraries 836 such as media libraries (e.g., libraries to support presentation and manipulation of various media formats such as MPEG4, H.264, MP3, AAC, AMR, JPG, and PNG), graphics libraries (e.g., an OpenGL framework that can be used to render 2D and 3D graphic content on a display), database libraries SQLite that may provide various relational database functions), web libraries (e.g., WebKit that may provide web browsing functionality), and the like. The libraries 816 may also include a wide variety of other libraries 838 to provide many other APIs to the applications 820 and other software components/modules.

The frameworks 818 (also sometimes referred to as middleware) may provide a higher-level common infrastructure that can be utilized by the applications 820 or other software components/modules. For example, the frameworks 818 may provide various graphic user interface (GUI) functions, high-level resource management, high-level location services, and so forth. The frameworks 818 may provide a broad spectrum of other APIs that can be utilized by the applications 820 and/or other software components/modules, some of which can be specific to a particular operating system or platform.

The applications 820 include built-in applications 840 and/or third-party applications 842. Examples of representative built-in applications 840 may include, but are not limited to, a home application, a contacts application, a browser application, a book reader application, a location application, a media application, a messaging application, or a game application.

The third-party applications 842 may include any of the built-in applications 840, as well as a broad assortment of other applications. In a specific example, the third-party applications 842 (e.g., an application developed using the Android™ or iOS™ software development kit (SDK) by an entity other than the vendor of the particular platform) can be mobile software running on a mobile operating system such as iOS™, Android™, Windows® Phone, or other mobile operating systems. In this example, the third-party applications 842 may invoke the API calls 824 provided by the mobile operating system such as the operating system 814 to facilitate functionality described herein.

The applications 820 may utilize built-in operating system functions (e.g., kernel 828, services 830, or drivers 832), libraries (e.g., system libraries 834, API libraries 836, and other libraries 838), or frameworks/middleware 818 to create user interfaces to interact with users of the system. Alternatively, or additionally, in some systems, interactions with a user may occur through a presentation layer, such as the presentation layer 844. In these systems, the application/module "logic" can be separated from the aspects of the application/module that interact with the user.

Some software architectures utilize virtual machines. In the example of FIG. 8, this is illustrated by a virtual machine 848. The virtual machine 848 creates a software environment where applications/modules can execute as if they were executing on a hardware machine (e.g., the machine 900 of FIG. 9). The virtual machine 848 is hosted by a host operating system (e.g., the operating system 814) and typically, although not always, has a virtual machine monitor 846, which manages the operation of the virtual machine 848 as well as the interface with the host operating system (e.g., the operating system 814). A software architecture executes within the virtual machine 848, such as an operating system 850, libraries 852, frameworks/middleware 854, applications 856, or a presentation layer 858. These layers of software architecture executing within the virtual machine 848 can be the same as corresponding layers previously described or can be different.

FIG. 9 illustrates a diagrammatic representation of a machine 900 in the form of a computer system within which a set of instructions can be executed for causing the machine 900 to perform any one or more of the methodologies discussed herein, according to an embodiment. Specifically, FIG. 9 shows a diagrammatic representation of the machine 900 in the example form of a computer system, within which instructions 916 (e.g., software, a program, an application, an apples, an app, or other executable code) for causing the machine 900 to perform any one or more of the methodologies discussed herein can be executed. For example, the instructions 916 may cause the machine 900 to execute any one of methods 500, 600 described above with respect to FIGS. 5 and 6. Additionally, or alternatively, the instructions 916 may implement the extensible claim verification systems of FIGS. 1 and 2. The instructions 916 transform the general, non-programmed machine 900 into a particular machine 900 programmed to carry out the described and illustrated functions in the manner described. In alternative embodiments, the machine 900 operates as a standalone device or can be coupled (e.g., networked) to other machines. In a networked deployment, the machine 900 may operate in the capacity of a server machine or a client machine in a server-client network environment, or as a peer machine in a peer-to-peer (or distributed) network environment. The machine 900 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 916, sequentially or otherwise, that specify actions to be taken by the machine 900. Further, while only a single machine 900 is illustrated, the term "machine" shall also be taken to include a collection of machines 900 that individually or jointly execute the instructions 916 to perform any one or more of the methodologies discussed herein.

The machine 900 may include processors 910, memory 930, and I/O components 950, which can be configured to communicate with each other such as via a bus 902. In an embodiment, the processors 910 (e.g., a central processing unit (CPU), a reduced instruction set computing (RISC) processor, a complex instruction set computing (CISC) processor, a graphics processing unit (GPU), a digital signal processor (DSP), an application-specific integrated circuit (ASIC), a radio-frequency integrated circuit (RFIC), another processor, or any suitable combination thereof) may include, for example, a processor 912 and a processor 914 that may execute the instructions 916. The term "processor" is intended to include multi-core processors that may comprise two or more independent processors (sometimes referred to as "cores") that may execute instructions contemporaneously. Although FIG. 9 shows multiple processors 910, the machine 900 may include a single processor with a single core, a single processor with multiple cores (e.g., a multi-core processor), multiple processors with a single core, multiple processors with multiples cores, or any combination thereof.

The memory 930 may include a main memory 932, a static memory 934, and a storage unit 936 including machine-readable medium 938, each accessible to the processors 910 such as via the bus 902. The main memory 932, the static memory 934, and the storage unit 936 store the instructions 916 embodying any one or more of the methodologies or functions described herein. The instructions 916 may also reside, completely or partially, within the main memory 932, within the static memory 934, within the storage unit 936, within at least one of the processors 910 (e.g., within the processor's cache memory), or any suitable combination thereof, during execution thereof by the machine 900.

The I/O components 950 may include a wide variety of components to receive input, provide output, produce output, transmit information, exchange information, capture measurements, and so on. The specific I/O components 950 that are included in a particular machine will depend on the type of machine. For example, portable machines such as mobile phones will likely include a touch input device or other such input mechanisms, while a headless server machine will likely not include such a touch input device. It will be appreciated that the I/O components 950 may include many other components that are not shown in FIG. 9. The I/O components 950 are grouped according to functionality merely for simplifying the following discussion, and the grouping is in no way limiting. In various embodiments, the I/O components 950 may include output components 952 and input components 954. The output components 952 may include visual components (e.g., a display such as a plasma display panel (PDP), a light-emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 954 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

In further embodiments, the IX components 950 may include biometric components 956, motion components 958, environmental components 960, or position components 962, among a wide array of other components. For example, the biometric components 956 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 958 may include acceleration sensor components (e.g., accelerometer), gravitation sensor components, rotation sensor components (e.g., gyroscope), and so forth. The environmental components 960 may include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detect concentrations of hazardous gases for safety or to measure pollutants in the atmosphere), or other components that may provide indications, measurements, or signals corresponding to a surrounding physical environment. The position components 962 may include location sensor components (e.g., a Global Positioning System (GPS) receiver component), altitude sensor components (e.g., altimeters or barometers that detect air pressure from which altitude can be derived), orientation sensor components (e.g., magnetometers), and the like.

Communication can be implemented using a wide variety of technologies. The I/O components 950 may include communication components 964 operable to couple the machine 900 to a network 980 or devices 970 via a coupling 982 and a coupling 972, respectively. For example, the communication components 964 may include a network interface component or another suitable device to interface with the network 980. In further examples, the communication components 964 may include wired communication components, wireless communication components, cellular communication components, near field communication (NFC) components, Bluetooth® components (e.g., Bluetooth® Low Energy), Wi-Fi® components, and other communication components to provide communication via other modalities. The devices 970 can be another machine or any of a wide variety of peripheral devices (e.g., a peripheral device coupled via a USB).

Moreover, the communication components 964 may detect identifiers or include components operable to detect identifiers. For example, the communication components 964 may include radio frequency identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information can be derived via the communication components 964, such as location via Internet Protocol (IP) geolocation, location via Wi-Fi® signal triangulation, location via detecting an NFC beacon signal that may indicate a particular location, and so forth.

Certain embodiments are described herein as including logic or a number of components, modules, elements, or mechanisms. Such modules can constitute either software modules (e.g., code embodied on a machine-readable medium or in a transmission signal) or hardware modules. A "hardware module" is a tangible unit capable of performing certain operations and can be configured or arranged in a certain physical manner. In various example embodiments, one or more computer systems (e.g., a standalone computer system, a client computer system, or a server computer system) or one or more hardware modules of a computer system (e.g., a processor or a group of processors) are configured by software (e.g., an application or application portion) as a hardware module that operates to perform certain operations as described herein.

In some embodiments, a hardware module is implemented mechanically, electronically, or any suitable combination thereof. For example, a hardware module can include dedicated circuitry or logic that is permanently configured to perform certain operations. For example, a hardware module can be a special-purpose processor, such as a field-programmable gate array (FPGA) or an application-specific integrated circuit (ASIC). A hardware module may also include programmable logic or circuitry that is temporarily configured by software to perform certain operations. For example, a hardware module can include software encompassed within a general-purpose processor or other programmable processor. It will be appreciated that the decision to implement a hardware module mechanically, in dedicated and permanently configured circuitry, or in temporarily configured circuitry (e.g., configured by software) can be driven by cost and time considerations.

Accordingly, the phrase "module" should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware modules are temporarily configured (e.g., programmed), each of the hardware modules need not be configured or instantiated at any one instance in time. For example, where a hardware module comprises a general-purpose processor configured by software to become a special-purpose processor, the general-purpose processor can be configured as respectively different special-purpose processors (e.g., comprising different hardware modules) at different times. Software can accordingly configure a particular processor or processors, for example, to constitute a particular hardware module at one instance of time and to constitute a different hardware module at a different instance of time.

Hardware modules can provide information to, and receive information from, other hardware modules. Accordingly, the described hardware modules can be regarded as being communicatively coupled. Where multiple hardware modules exist contemporaneously, communications can be achieved through signal transmission (e.g., over appropriate circuits and buses) between or among two or more of the hardware modules. In embodiments in which multiple hardware modules are configured or instantiated at different times, communications between or among such hardware modules can be achieved, for example, through the storage and retrieval of information in memory structures to which the multiple hardware modules have access. For example, one hardware module performs an operation and stores the output of that operation in a memory device to which it is communicatively coupled. A further hardware module can then, at a later time, access the memory device to retrieve and process the stored output. Hardware modules can also initiate communications with input or output devices, and can operate on a resource (e.g., a collection of information).

The various operations of example methods described herein can be performed, at least partially, by one or more processors that are temporarily configured (e.g., by software) or permanently configured to perform the relevant operations. Whether temporarily or permanently configured, such processors constitute processor-implemented modules that operate to perform one or more operations or functions described herein. As used herein, "processor-implemented module" refers to a hardware module implemented using one or more processors.

Similarly, the methods described herein can be at least partially processor-implemented, with a particular processor or processors being an example of hardware. For example, at least sonic of the operations of a method can be performed by one or more processors or processor-implemented modules. Moreover, the one or more processors may also operate to support performance of the relevant operations in a "cloud computing" environment or as a "software as a service" (SaaS). For example, at least some of the operations can be performed by a group of computers (as examples of machines 900 including processors 910), with these operations being accessible via a network (e.g., the Internet) and via one or more appropriate interfaces (e.g., an API). In certain embodiments, for example, a client device may relay or operate in communication with cloud computing systems, and may access circuit design information in a cloud environment.

The performance of certain of the operations can be distributed among the processors, not only residing within a single machine 900, but deployed across a number of machines 900. In some example embodiments, the processors 910 or processor-implemented modules are located in a single geographic location (e.g., within a home environment, an office environment, or a server farm). In other example embodiments, the processors or processor-implemented modules are distributed across a number of geographic locations.

Executable Instructions and Machine Storage Medium

The various memories (i.e., 930, 932, 934, and/or the memory of the processor(s) 910) and/or the storage unit 936 may store one or more sets of instructions 916 and data structures (e.g., software) embodying or utilized by any one or more of the methodologies or functions described herein. These instructions (e.g., the instructions 916), when executed by the processor(s) 910, cause various operations to implement the disclosed embodiments.

As used herein, the terms "machine-storage medium," "device-storage medium," and "computer-storage medium" mean the same thing and can be used interchangeably. The terms refer to a single or multiple storage devices and/or media (e.g., a centralized or distributed database, and/or associated caches and servers) that store executable instructions 916 and/or data. The terms shall accordingly be taken to include, but not be limited to, solid-state memories, and optical and magnetic media, including memory internal or external to processors. Specific examples of machine-storage media, computer-storage media and/or device-storage media include non-volatile memory, including by way of example semiconductor memory devices, e.g., erasable programmable read-only memory (EPROM), electrically erasable programmable read-only memory (EEPROM), field-programmable gate array (FPGA), and flash memory devices; magnetic disks such as internal hard disks and removable disks; magneto-optical disks; and CD-ROM and DVD-ROM disks. The terms "machine-storage media," "computer-storage media," and "device-storage media" specifically exclude carrier waves, modulated data signals, and other such media, at least some of which are covered under the term "signal medium" discussed below.

Transmission Medium

In various embodiments, one or more portions of the network 980 can be an ad hoc network, an intranet, an extranet, a virtual private network (VPN), a local-area network (LAN), a wireless LAN (WLAN), a wide-area network (WAN), a wireless WAN (WWAN), a metropolitan-area network (MAN), the Internet, a portion of the Internet, a portion of the public switched telephone network (PSTN), a plain old telephone service (POTS) network, a cellular telephone network, a wireless network, a Wi-Fi® network, another type of network, or a combination of two or more such networks. For example, the network 980 or a portion of the network 980 may include a wireless or cellular network, and the coupling 982 can be a Code Division Multiple Access (CDMA) connection, a Global System for Mobile communications (GSM) connection, or another type of cellular or wireless coupling. In this example, the coupling 982 may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High-Speed Packet Access (HSPA), Worldwide Interoperability for Microwave Access (WiMAX), Long-Term Evolution (LTE) standard, others defined by various standard-setting organizations, other long-range protocols, or other data transfer technology.

The instructions can be transmitted or received over the network using a transmission medium via a network interface device (e.g., a network interface component included in the communication components) and utilizing any one of a number of well-known transfer protocols (e.g., hypertext transfer protocol (HTTP)). Similarly, the instructions can be transmitted or received using a transmission medium via the coupling (e.g., a peer-to-peer coupling) to the devices 970. The terms "transmission medium" and "signal medium" mean the same thing and can be used interchangeably in this disclosure. The terms "transmission medium" and "signal medium" shall be taken to include any intangible medium that is capable of storing, encoding, or carrying the instructions for execution by the machine, and include digital or analog communications signals or other intangible media to facilitate communication of such software. Hence, the terms "transmission medium" and "signal medium" shall be taken to include any form of modulated data signal, carrier wave, and so forth. The term "modulated data signal" means a signal that has one or more of its characteristics set or changed in such a manner as to encode information in the signal.

Computer-Readable Medium

The terms "machine-readable medium," "computer-readable medium," and "device-readable medium" mean the same thing and may be used interchangeably in this disclosure. The terms are defined to include both machine-storage media and transmission media. Thus, the terms include both storage devices/media and carrier waves/modulated data signals.

Throughout this specification, plural instances may implement resources, components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components.

As used herein, the term "or" may be construed in either an inclusive or exclusive sense. The terms "a" or "an" should be read as meaning "at least one," "one or more," or the like. The presence of broadening words and phrases such as "one or more," "at least," "but not limited to," or other like phrases in some instances shall not be read to mean that the narrower case is intended or required in instances where such broadening phrases may be absent. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. The specification and drawings are, accordingly, to be regarded in an illustrative rather than a restrictive sense.

It will be understood that changes and modifications may be made to the disclosed embodiments without departing from the scope of the present disclosure. These and other changes or modifications are intended to be included within the scope of the present disclosure.

What is claimed is:

1. A method comprising:
    configuring, by one or more processors, access to an external electronic claim verification service based on user credential information, wherein the external electronic claim verification service is wholly self-contained from the one or more processors;
    receiving, from a client device associated with a user, by the one or more processors, a request for verifying one or more claims for the user, wherein the one or more claims comprises information that is to be verified by one or more external electronic claim verification services, and wherein a verification of the one or more claims is a prerequisite to the user to electronically sign an electronic document; and
    in response to receiving the request from the client device:
        causing, by the one or more processors, based on the configured access to the external electronic claim verification service, the client device to be directed to the external electronic claim verification service of the one or more external electronic claim verification services using a universal resource locator-based redirection to verify the one or more claims for the user, wherein the external electronic claim verification service performs a set of actions to verify the one or more claims for the user;
        sending, by the one or more processors, a claim verification request to the external electronic claim verification service using a unified protocol interfacing with the external electronic claim verification service and at least one other external electronic claim verification service, wherein the claim verification request includes the one or more claims to verify by the external electronic claim verification service and a request object comprising a digital token containing at least an identifier of an electronic signature workflow associated with a claim for which verification is requested, an identifier of the user, and a timestamp indicating when the digital token was issued;
        receiving, by the one or more processors, from the external electronic claim verification service, using the unified protocol, a first response indicating a result of the verification of the one or more claims, wherein the external electronic claim verification service redirects the client device back to the one or more processors; and
        providing, by the one or more processors, to the client device, a second response based on the first response, wherein the user is enabled to electronically sign the electronic document based on the second response.

2. The method of claim 1, wherein the set of actions comprises:
    authenticating the user with the external electronic claim verification service based on a set of user credentials provided by the user.

3. The method of claim 1, wherein the information that is to be verified comprises information associated with identifying the user.

4. The method of claim 1, wherein at least one of the first response or the second response is digitally signed.

5. The method of claim 1, wherein the second response comprises an authentication token embedded with a claim verification value for at least one claim in the one or more claims.

6. The method of claim 5, wherein the authentication token of the second response is used to authenticate the user at the client device.

7. The method of claim 1, further comprising:
    generating, by the one or more processors, a transaction identifier associated with the request; and
    logging, by the one or more processors and in a data structure, information regarding a set of operations performed in response to the request, the logged information comprising the transaction identifier.

8. The method of claim 7, wherein the logged information comprises a requester client identifier associated with the client device and an external electronic claim verification service identifier associated with the external electronic claim verification service.

9. The method of claim 1, further comprising:
    in response to the request:
        requesting, by the one or more processors, consent from the user to access the external electronic claim verification service in connection with verifying the one or more claims for the user.

10. The method of claim 1, wherein the claim is determined to be verified by the external electronic claim verification service based on the electronic signature workflow associated with the electronic document.

11. The method of claim 1, wherein the external electronic claim verification service is selected from the one or more external electronic claim verification services based on the electronic signature workflow associated with the electronic document.

12. The method of claim 1, wherein the unified protocol comprises an OpenID Connect protocol.

13. A server system comprising:
    a memory storing instructions; and
    one or more processors communicatively coupled to the memory, wherein the instructions, when executed by the one or more processors, cause the one or more processors to:
        configure access to an external electronic claim verification service based on user credential information, wherein the external electronic claim verification service is wholly self-contained from the server system;
        receive, from a client device associated with a user, a request for verifying one or more claims for the user, wherein the one or more claims comprises information that is to be verified by one or more of the external electronic claim verification services, and wherein a verification of the one or more claims is a prerequisite to the user to electronically sign an electronic document; and in response to receiving the request from the client device:

cause, based on the configured access to the external electronic claim verification service, the client device to be directed to the external electronic claim verification service of the one or more external electronic claim verification services using a universal resource locator-based redirection to verify the one or more claims for the user, the external electronic claim verification service performs a set of actions to verify the one or more claims for the user;

send a claim verification request to the external electronic claim verification service using a unified protocol interfacing the external electronic claim verification service and at least one other external electronic claim verification service, wherein the claim verification request includes the one or more claims to verify by the external electronic claim verification service and a request object comprising a digital token containing at least an identifier of an electronic signature workflow associated with a claim for which verification is requested, an identifier of the user, and a timestamp indicating when the digital token was issued;

receive, from the external electronic claim verification service, using the unified protocol, a first response indicating a result of the verification of the one or more claims, wherein the external electronic claim verification service redirects the client device back to the server system; and provide, to the client device, a second response based on the first response, wherein the user is enabled to electronically sign the electronic document based on the second response.

14. Non-transitory computer-readable storage media comprising instructions which, when executed by one or more processors, cause the one or more processors to:

configure access to an external electronic claim verification service based on user credential information, wherein the external electronic claim verification service is wholly self-contained from the one or more processors;

receive a request from a client device associated with a user, the request for verifying one or more claims for the user, wherein the one or more claims comprises information that is to be verified by one or more of the external electronic claim verification services, and wherein a verification of the one or more claims is a prerequisite to the user to electronically sign an electronic document; and in response to receiving the request from the client device:

cause, based on the configured access to the external electronic claim verification service, the client device to be directed to the external electronic claim verification service of the one or more external electronic claim verification services using a universal resource locator-based redirection to verify the one or more claims for the user, the external electronic claim verification service performs a set of actions to verify the set of one or more claims for the user;

send a claim verification request to the external electronic claim verification service using a unified protocol interfacing the external electronic claim verification service and at least one other external electronic claim verification service, wherein the claim verification request includes the one or more claims to verify by the external electronic claim verification service and a request object comprising a digital token containing at least an identifier of an electronic signature workflow associated with a claim for which verification is requested, an identifier of the user, and a timestamp indicating when the digital token was issued;

receive, from the external electronic claim verification service, using the unified protocol, a first response indicating a result of the verification of the one or more claims, wherein the external electronic claim verification service redirects the client device back to the one or more processors;

and provide, to the client device, a second response based on the first response, wherein the user is enabled to electronically sign the electronic document based on the second response.

* * * * *